United States Patent
Xue et al.

(10) Patent No.: US 11,570,807 B2
(45) Date of Patent: Jan. 31, 2023

(54) CONFIGURED GRANT FOR MULTI-HOP IN SIDELINK

(71) Applicant: QUALCOMM INCORPORATED, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 81 days.

(21) Appl. No.: 17/241,880

(22) Filed: Apr. 27, 2021

(65) Prior Publication Data

US 2022/0346133 A1 Oct. 27, 2022

(51) Int. Cl.
*H04W 72/14* (2009.01)
*H04W 72/02* (2009.01)
*H04W 76/11* (2018.01)
*H04W 16/28* (2009.01)
*H04W 72/04* (2009.01)

(52) U.S. Cl.
CPC .......... *H04W 72/14* (2013.01); *H04W 16/28* (2013.01); *H04W 72/02* (2013.01); *H04W 72/046* (2013.01); *H04W 76/11* (2018.02)

(58) Field of Classification Search
CPC ..... H04W 72/14; H04W 76/11; H04W 16/28; H04W 72/02; H04W 72/046
See application file for complete search history.

(56) References Cited

U.S. PATENT DOCUMENTS

| | | | |
|---|---|---|---|
| 5,987,011 A * | 11/1999 | Toh ..................... | H04W 40/10 370/255 |
| 2006/0168337 A1* | 7/2006 | Stahl .................... | H04L 47/822 709/240 |
| 2011/0058554 A1* | 3/2011 | Jain ...................... | H04L 45/00 370/392 |
| 2013/0235732 A1* | 9/2013 | Nema ................... | H04W 84/18 370/241 |
| 2015/0180771 A1* | 6/2015 | Ashwood-Smith ..... | H04L 45/34 370/392 |
| 2018/0041420 A1* | 2/2018 | Saad ..................... | H04L 45/22 |
| 2020/0344708 A1* | 10/2020 | Liao ..................... | H04W 40/22 |
| 2020/0359366 A1* | 11/2020 | Kim ..................... | H04L 1/1812 |
| 2021/0022131 A1* | 1/2021 | Liu ...................... | H04W 72/085 |
| 2021/0050888 A1* | 2/2021 | Manolakos ........... | H04B 7/088 |
| 2021/0204252 A1* | 7/2021 | Akkarakaran ........ | H04W 72/02 |
| 2021/0377993 A1* | 12/2021 | Ayaz .................... | H04W 76/14 |
| 2022/0095411 A1* | 3/2022 | Lin ...................... | H04W 76/27 |
| 2022/0225448 A1* | 7/2022 | Li ........................ | H04W 68/005 |
| 2022/0256557 A1* | 8/2022 | Kang .................... | H04L 67/60 |

* cited by examiner

*Primary Examiner* — Christopher M Crutchfield
*Assistant Examiner* — Tito Q Pham
(74) *Attorney, Agent, or Firm* — Haynes and Boone, LLP

(57) ABSTRACT

Wireless communications systems and methods related to multi-hop sidelink are provided. In one aspect, a first user equipment (UE) receives, from a base station (BS), a configured grant (CG) indicating a first CG occasion. The first CG occasion includes a first transmit resource and a first receive window. The first UE receives, from a second UE in the first receive window, a first communication signal including a first data block. The first UE transmits, to a third UE in the first transmit resource, a second communication signal including the first data block.

28 Claims, 16 Drawing Sheets

CONFIGURED GRANT FOR MULTI-HOP IN SIDELINK

TECHNICAL FIELD

This application relates to wireless communication systems, and more particularly to multi-hop sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a first user equipment (UE), the method includes receiving, from a base station (BS), a configured grant (CG) indicating a first CG occasion, the first CG occasion including a first transmit resource and a first receive window; receiving, from a second UE in the first receive window, a first communication signal including a first data block; and transmitting, to a third UE in the first transmit resource, a second communication signal including the first data block.

In an additional aspect of the disclosure, a method of wireless communication performed by a base station (BS), the method includes transmitting, to a first user equipment (UE), a first configured grant (CG) indicating a first CG occasion, the first CG occasion including a first transmit resource and a first receive window; and transmitting, to a second UE, a second CG indicating a second CG occasion, the second CG occasion including a second transmit resource and a second receive window, where the first UE and the second UE are associated with a sidelink multi-hop path.

In an additional aspect of the disclosure, a first user equipment (UE) includes a memory; a transceiver; and at least one processor coupled to the memory and the transceiver, where the at least one processor is configured to receive, via the transceiver from a base station (BS), a configured grant (CG) indicating a first CG occasion, the first CG occasion including a first transmit resource and a first receive window; receive, via the transceiver from a second UE in the first receive window, a first communication signal including a first data block; and transmit, via the transceiver to a third UE in the first transmit resource, a second communication signal including the first data block.

In an additional aspect of the disclosure, a base station (BS) includes a memory; a transceiver; and at least one processor coupled to the memory and the transceiver, where the at least one processor is configured to transmit, via the transceiver to a first user equipment (UE), a first configured grant (CG) indicating a first CG occasion, the first CG occasion including a first transmit resource and a first receive window; and transmit, via the transceiver to a second UE, a second CG indicating a second CG occasion, the second CG occasion including a second transmit resource and a second receive window, where the first UE and the second UE are associated with a sidelink multi-hop path.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
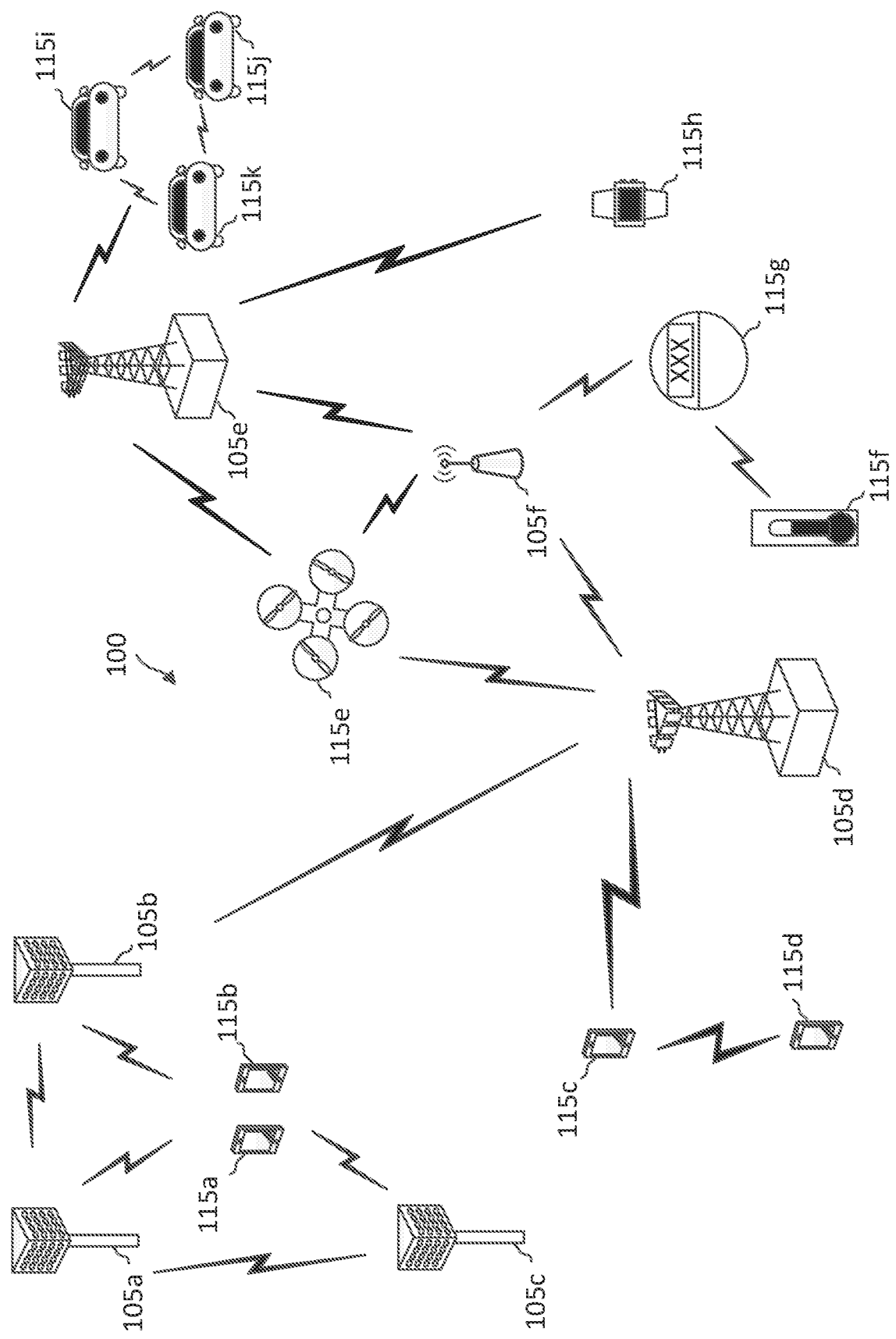
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 (SCI-1), and additional SCI, which may be referred to as SCI part 2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through a BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and as a receiving sidelink UE at another time. As used herein, the term "sidelink relay UE" can refer to a user equipment device located along a multi-hop path receiving sidelink data from a previous-hop UE and forwarding the received sidelink data to a next-hop UE. The previous-hop UE can be a sidelink transmitting UE that initiated the sidelink transmission or another sidelink relay UE. The next-hop UE can be a target sidelink UE or destination UE for the sidelink transmission or another sidelink relay UE. Further, a UE may operate as sidelink relay UE at one time and as an initiating UE or a destination UE at another time.

In some aspects, sidelink may operate over a high-frequency band, such as a mmWave band. Because of the high pathloss at the high frequencies, a sidelink transmitting UE may utilize transmit beamforming to generate a transmission beam for transmitting sidelink data to a peer sidelink receiving UE, and the sidelink receiving UE may utilize receive beamforming to generate a reception beam for receiving the sidelink data from the sidelink transmitting UE.

As used herein, the term "transmission beam" may refer to a wireless communication device transmitting a beamformed signal in a certain spatial direction or beam direction and/or with a certain beam width covering a certain spatial angular sector. The transmission beam may have characteristics such as the beam direction and the beam width. The term "reception beam" may refer to a wireless communication device using beamforming to receive a signal from a certain spatial direction or beam direction and/or within a certain beam width covering a certain spatial angular sector. The reception beam may have characteristics such as the beam direction and the beam width. As used herein, the term "beam sweep" may refer to a wireless communication device using sequentially each beam of a set of predefined beams (directing to a set of predefined spatial directions) for transmissions or receptions over a time period to cover a certain angular sector spatially.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

In some aspects, NR may utilize sidelink to deliver safety related messages over intelligent transport system (ITS) bands, for example, at 5.9 gigahertz (GHz) or other sub-6 GHz licensed bands. While deployments of sidelink in mmWave bands have been considered, there have been few optimizations developed specifically for sidelink. Further, NR may extend the use of sidelink into vertical domains, such as health, agriculture, smart energy, industrial automation, and/or other enterprise domain. However, some vertical domains may not have access to the sub-6 GHz licensed band. While some vertical domains may have access to the sub-6 GHz licensed band, those vertical domains are seeking opportunities to utilize other bands, such as unlicensed bands at sub-6 GHz and/or 60 GHz. The high-frequency bands can be attractive due to the larger bandwidth compared to lower-frequency bands, where the larger bandwidth can support high-data-rate links. However, in some scenarios, it may be difficult for a pair of sidelink UEs to establish a high-data-rate direct link with each other in these high-frequency bands, for example, due to the unavailability of beam alignments (e.g., at 60 GHz) and/or the limited power allowed for communications (e.g., when operating in very-low-power (VLP) mode at 6 GHz). Accordingly, it may be desirable to utilize relays with multi-hops for sidelink so that sidelink can better utilize the availability of the larger bandwidths at high frequencies.

The present disclosure describes mechanisms for providing multi-hop sidelink communications using network-controlled resource allocations (e.g., NR mode-1 RRA) with configured grants. For example, a BS may configure a first UE with a first configured grant (CG). The first UE may operate as a sidelink relay UE and the first CG may be used for multi-hop sidelink operations. The first CG may indicate a first CG occasion. The first CG may also indicate a periodicity associated with the first CG occasion. That is, the first CG occasion may repeat according to the periodicity. The first CG occasion may include a first transmit resource and an associated first receive window. The first receive window may include one or more receive resources. In some aspects, the first transmit resource may be subsequent to the first receive window in time. In this way, the first UE may monitor the first receive window for sidelink data for relaying, and upon detecting sidelink data for relaying, the first UE may utilize the transmit resource to forward the sidelink data. For instance, the first UE may receive a first communication signal including a first data block from a second UE. The first data block may be a medium access control (MAC) layer transport block (TB) including information data. The second UE may be a previous-hop UE with respect to the first UE along a multi-hop sidelink path. The first communication signal may include address information associated with the first data block. The first UE may determine that the first data block is for relaying by the first UE (e.g., based on the address information) and transmit a second communication signal including the first data block to a third UE. The third UE may be a next-hop UE with respect to the first UE along the multi-hop sidelink path.

In some aspects, the address information associated with the first data block may include a source identifier (ID), a hop-source ID, and a hop-destination ID, and a destination ID. The source ID may identify a UE that initiated the transmission of the first data block along the multi-hop path. The hop-source ID may identify a previous-hop UE in the multi-hop path. The hop-destination ID may identify a next-hop UE in the multi-hop path. The destination ID may identify a target sidelink receiving UE of the first data block. In some instances, the first UE may determine that the first data block is for relaying by the first UE based on a match between the hop-destination ID associated with the first data block and the first UE's ID. Additionally or alternatively, the first UE may determine that the first data block is for relaying by the first UE based on the destination ID associated with the first data block being within a set of destination IDs for relaying by the first UE. In some aspects, the BS may configure the first UE with the set of destination IDs for relaying and/or a routing configuration (e.g., a routing table) for relaying data for each destination ID in the set.

In some aspects, the first UE may utilize transmit beamforming for forwarding data to a next-hop UE. For instance, the first UE may transmit the second communication signal to the third UE in a first beam direction. In this regard, the first UE may configure antenna elements (of an antenna panel or antenna array) at the first UE to generate a first transmission beam in the first beam direction towards the third UE and transmit the second communication signal using the first transmission beam. In some aspects, the first UE may further transmit a third communication signal including the first data block to a fourth UE different from the third UE in a second beam direction different from the first beam direction. In this regard, the first UE may configure the antenna elements at the first UE to generate a second transmission beam in the second beam direction towards the fourth UE and transmit the third communication signal using the second transmission beam. In some aspects, the BS may further configure the UE with quasi-co-location (QCL) information for relaying. The QCL information may include indications of beam directions. For instance, the BS may configure the first UE with a routing configuration (e.g., a routing table) indicating the first beam direction for a hop-destination ID identifying the third UE and indicating the second beam direction for a hop-destination ID identifying the fourth UE. In some aspects, the first UE may transmit the second communication signal in the first beam direction and transmit the third communication signal in the second beam direction at the same time using the first transmit resource. In other aspects, the first UE may utilize beam sweep when forwarding data to a next-hop UE. For instance, in some aspects, the first CG occasion may further include a second transmit resource associated with the first receive window, and the first UE may transmit the third communication signal in the second beam direction using the second transmit resource.

In some aspects, the first UE may utilize receive beamforming and/or beam sweep for receptions in the first receive window. For instance, the first UE may monitor the first receive window in a plurality of beam directions for a data block for relaying, and may receive the first communication signal including the first data block from the monitoring. In this regard, the first UE may configure the antenna elements at the first UE to generate a first reception beam in a first beam direction of the plurality of beam directions, receive a signal from the first beam direction, perform SCI decoding and/or data decoding on the received signal to determine whether there is data for relaying, and repeat the beam generation, the signal reception, and SCI and/or data decoding for a second reception beam in a second beam direction of the plurality of beam directions different from the first beam direction.

In some aspects, the first UE may receive multiple data blocks for relaying from the receive window. For instance, the first UE may receive a third communication signal from a fourth UE in the first receive window. The third communication signal may include a second data block having a different priority than the first data block. The first UE may determine whether to utilize the first transmit resource associated with the first receive window to forward the first data block or the second data block based on priorities (traffic priorities) of the first and second data blocks. For instance, the first UE may transmit the second communication signal including the first data block in the first transmit resource based on the first data block having a higher priority than the second data block. In other aspects, the first data block and the second data block may have a same priorities, and the first UE may transmit the second communication signal including the first data block in the first transmit resource based on the first data block is successfully received before the second data block.

In some aspects, the first UE may monitor a second CG occasion associated with the CG (e.g., based on the CG periodicity) and may fail to detect a data block in a second receive window of the second CG occasion for relaying. For instance, the first UE may fail to decode SCI and/or a data block (PSSCH data) successfully in the second receive window. In other instances, the first UE may successfully decode SCI and a data block (PSSCH data) in the second receive window, but the data block is not for relaying by the first UE (e.g., with a hop-destination ID identifying a different UE than the second UE and/or with a destination ID that is not within a set of destination IDs for relaying by the first UE). The first UE may transmit, to the BS, an indication of a failure to detect a data block for relaying in the second window. In response, the BS may reschedule another UE to utilize a second transmit resource of the second CG occasion associated with the second receive window.

In some aspects, the first communication signal may include SCI transmitted in a PSCCH portion of the first transmit resource and the first data block transmitted in a PSSCH portion of the first transmit resource. The first CG occasion may include a second transmit resource and the BS may configure the first UE to repeat the transmission of the SCI and the first data block in the second transmit resource. In this way, the third UE may receive a first transmission of the SCI and the first data block in the first transmit resource and receive a second transmission of the SCI and the first data block in the second transmit resource, combine the first transmission of the SCI and the second transmission of the SCI for SCI decoding. and/or combine the first transmission of the first data block and the second transmission of the first data block for data decoding.

Aspects of the present disclosure can provide several benefits. For example, utilizing CGs with CG occasions each including transmit resource(s) and an associated receive window for multi-hop relay operations can be efficient in terms of scheduling overhead, for example, eliminating per-transmission scheduling request (from each relay UE) and/or per-transmission dynamic grant (for each relay UE) that may otherwise be used for dynamic scheduling. Additionally, utilizing CGs may allow a sidelink relay UE to operate in a sleep mode or low-power mode between CG occasions instead of having to operate in an active state constantly to monitor for dynamic grants if dynamic scheduling is used for multi-hop sidelink relaying, and thus may provide power saving at sidelink relay UEs. Further, associating QCL sources with hop-destination IDs, for example, in a routing table, can allow a sidelink relay UE to relay data in specific beam direction(s), and thus may improve sidelink relay performance when operating in high-frequency bands. Similarly, utilizing receive beamforming and/or beam sweep for receptions in receive windows of CG occasions can also improve sidelink relay performance when operating in high-frequency bands.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel.

Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may provision for sidelink communications to allow a UE 115 to communicate with another UE 115 without tunneling through a BS 105 and/or the core network. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI (which may be referred to as SCI-1), the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI (which may be referred to as SCI-2), the UE 115 may transmit SCI in PSSCH carrying information for decoding the PSSCH. The second-stage SCI may include an 8-bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

In some aspects, the network 100 may operate over a mmWave band (e.g., at 60 GHz). Due to the high pathloss in the mmWave band, the BSs 105 and the UEs 115 may utilize directional beams to communicate with each other. For instance, a BS 105 and/or a UE 115 may be equipped with one or more antenna panels or antenna arrays with antenna elements that can be configured to focus transmit signal energy and/or receive signal energy in a certain spatial direction and within a certain spatial angular sector or width. Similarly, UEs 115 may also utilize directional beams to communicate with each other for sidelink communications. In general, a BS 105 and/or a UE 115 may be capable of generating a transmission beam for transmission or a reception beam for reception in various spatial direction or beam directions.

As explained above, NR supports a mode-1 RRA and a mode-2 RRA for sidelink communications. In some aspects, the network 100 may support mode-1 RRA. For instance, a sidelink transmitting UE 115 may transmit a scheduling request (SR) or a buffer status report (BSR) to a serving BS 105 to request a resource allocation for a sidelink transmission to a peer sidelink receiving UE 115. The SR or the BS may indicate a number of data bytes ready for transmission to the sidelink receiving UE 115. Upon receiving the SR or BSR, the BS 105 may allocate a resource for the sidelink transmitting UE 115 to transmit to the sidelink receiving UE 115. The BS 105 may transmit to the sidelink transmitting UE 115 a dynamic grant indicating the allocated resource and/or any other transmission parameters (e.g., MCS and/or transmit power parameters). Upon receiving the dynamic grant, the sidelink transmitting UE 115 may transmit sidelink data (e.g., a TB) to the peer sidelink transmitting UE using the allocated resource and/or the transmit parameters. In some aspects, the sidelink transmitting UE 115 may request multiple resource allocations (e.g., up to about 3) for transmission/retransmission of a certain TB.

Figure 2:
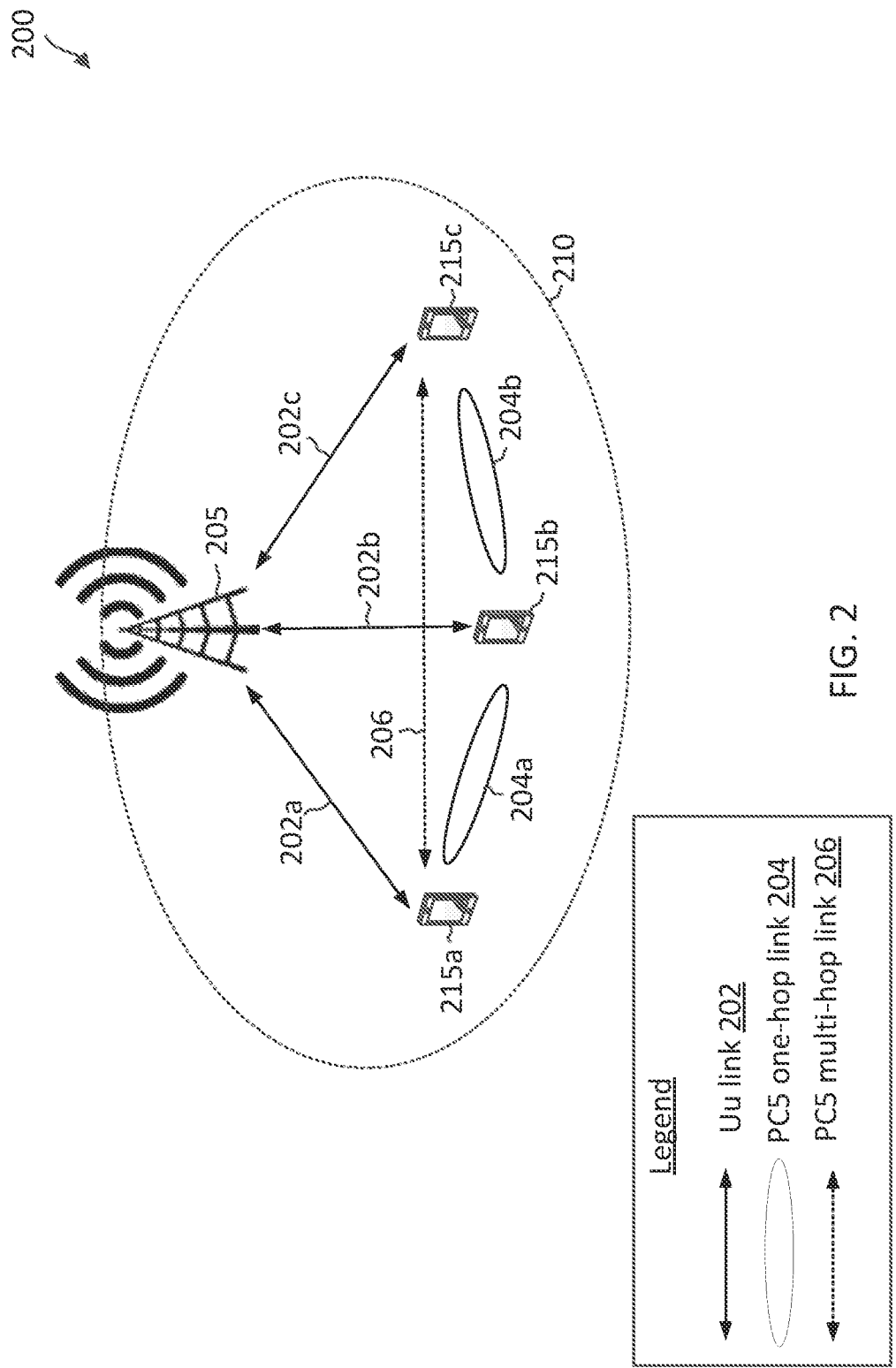
FIG. 2 illustrates a communication scenario according to some aspects of the present disclosure.

FIG. 2 illustrates a communication scenario 200 according to aspects of the present disclosure. In some aspects, the communication scenario 200 may correspond to a communication scenario among BSs 105 and or UEs 115 in the network 100. For simplicity, FIG. 2 illustrates one BS 205 and three UEs 215 (shown as 215a, 215b, and 215c), but a greater number of UEs 215 (e.g., about 4, 5, 6 or more) and/or BSs 205 (e.g., about 2, 3, 4 or more) may be supported. The BS 205 and the UEs 215 may be similar to the BSs 105 and the UEs 115, respectively.

In the scenario 200, the BS 205 may serve the UEs 215a, 215b, and 215c within a coverage 210 of the BS 205. The BS 205 may communicate with each of the UEs 215 via a corresponding Uu link 202 (shown by the solid lines with arrows). As shown, the UE 215a may communicate with the BS 205 via a Uu link 202a, the UE 215b may communicate with the BS 205 via a Uu link 202b, and the UE 215c may communicate with the BS 205 via a Uu link 202c.

The UEs 215 may also communicate with each other directly using sidelink. That is, the UEs 215 can communicate sidelink data (e.g., TBs) with each other without tunneling through the BS 205. In some instances, the UEs 215 may communicate with each other over a high-frequency band (e.g., 60 GHz band) using beamforming techniques. As illustrated in FIG. 2, the UE 215a may communicate with the UE 215b using beamforming over a PC5 one-hop link 204a. That is, the UE 215a may communicate with the UE 215b directly without a relay. In a similar way, the UE 215b may communicate the UE 215c using beamforming over another PC5 one-hop link 204b and directly communicate with the UE 215c without a relay. With beamforming over the high-frequency band, the PC5 one-hop link 204 can support a high data rate. In some instances, the UE 215a may desire to communicate with the UE 215c. However, while the UE 215a may utilize transmit beamforming and the UE 215c may utilize receive beamforming for the communication, the communication may not reach the UE 215c, for example, due to a lack of beam alignment between the UE 215a and the UE 215c. The lack of beam alignment can be caused by the locations of the UEs 215a and the UE 215c or other blockages in the environment between the UEs 215a and the UE 215c.

One approach to enabling the UE 215a to communicate with the UE 215c with a high data rate is to utilize the UE 215b as a relay. For instance, the UE 215a may utilize transmit beamforming to transmit a sidelink transmission (e.g., TB) destined for the UE 215c via the UE 215b over the link 204a. Upon receiving the sidelink transmission destined for the UE 215c, the UE 215b may utilize transmit beamforming to forward or relay the sidelink transmission (e.g., the TB) to the UE 215c over the link 204b. The UE 215c may utilize receive beamforming to receive the sidelink transmission from the UE 215b. Thus, a PC5 multi-hop link 206 can be formed between the UE 215a and the UE 215c via the UE 215b. While FIG. 2 illustrates the PC5 multi-hop link 206 as a two-hop link, aspects are not limited thereto. For instance, the PC5 multi-hop link 206 can include a greater number of hops (e.g., about 3, 4 or more).

In some aspects, the UEs 215 may utilize mode-1 RRA for sidelink communications. That is, the BS 205 may control the allocation of resources for sidelink communications. To that end, each UE 215 desiring to transmit over a sidelink may request for a scheduling grant from BS 205. For instance, the UE 215a may transmit a SR or a BSR to the BS 205 over the Uu link 202a, and in response to the UE 215a's request, the BS 205 may transmit a dynamic grant to the UE 215a over the Uu link 202a indicating an allocated resource. In a similar way, the UE 215b may transmit a SR or a BSR to the BS 205 over the Uu link 202b, and in response to the UE 215b's request, the BS 205 may transmit a dynamic grant to the UE 215b the Uu link 202b indicating an allocated resource. The UE 215c may transmit a SR or a BSR to the BS 205 over the Uu link 202c, and in response to the UE 215c's request, the BS 205 may transmit a dynamic grant to the UE 215c the Uu link 202c indicating an allocated resource. As such, for multi-hop sidelink communications, each sidelink relay UE 115 along a sidelink multi-hop path may request for an allocation to relay sidelink data to a next-hop UE 115 as will be discussed below with reference to FIG. 3.

Figure 3:
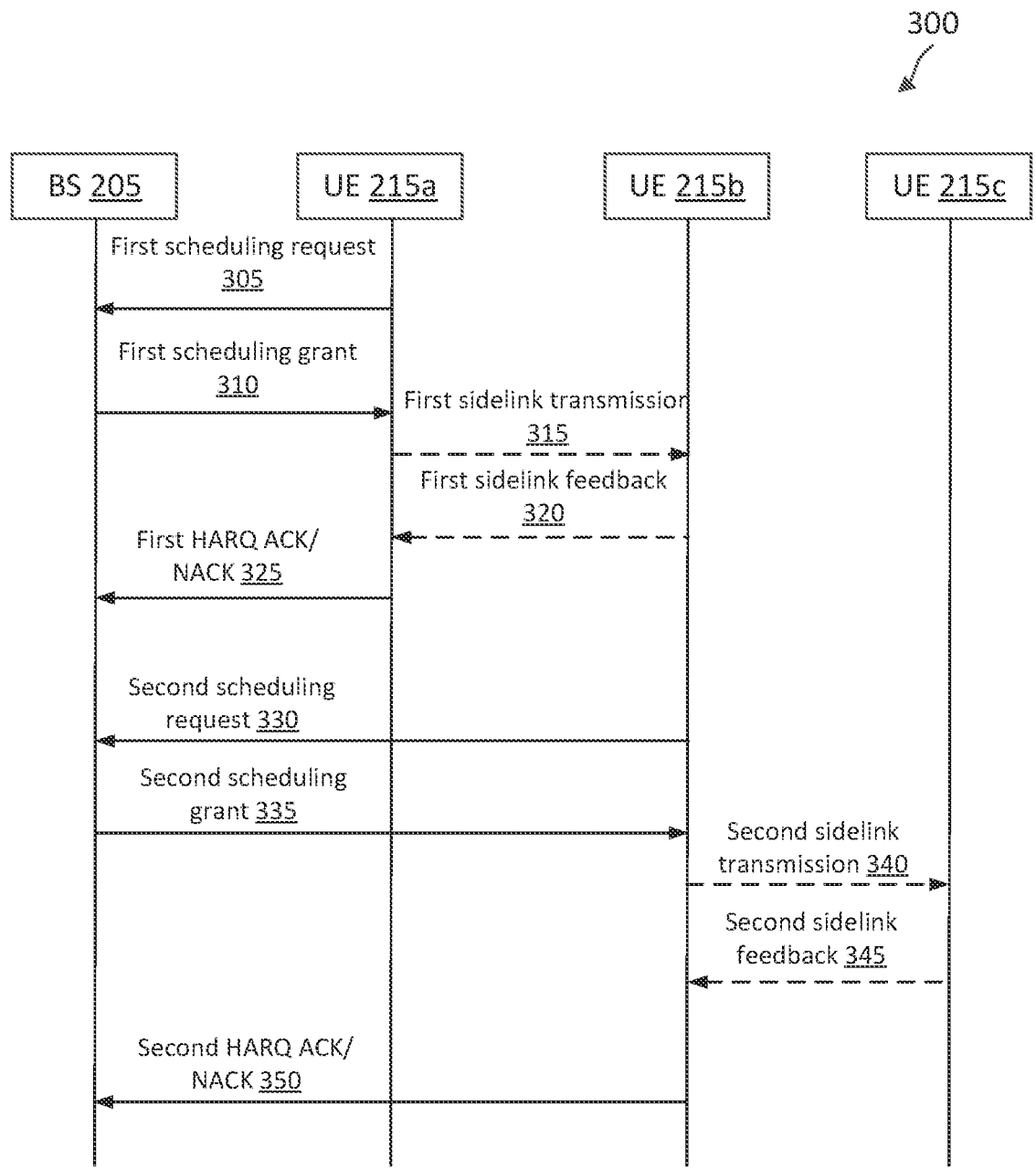
FIG. 3 is a sequence diagram illustrating a multi-hop sidelink communication method that utilizes dynamic grants according to some aspects of the present disclosure.

FIG. 3 is a sequence diagram illustrating a multi-hop sidelink communication method 300 that utilizes dynamic grants according to some aspects of the present disclosure. The method 300 may be implemented between a BS 205 and UEs 215a, 215b, and 215c. The method 300 is discussed with reference to FIG. 2 to illustrate multi-hop sidelink communications with dynamic grants. In some aspects, the BS 205 may correspond to the BS 1400 of FIG. 14 and may utilize one or more components, such as the processor 1402, the memory 1404, the sidelink configured grant module 1408, the transceiver 1410, the modem 1412, and the one or more antennas 1416 with reference to FIG. 14, to execute the actions of the method 300. In some aspects, the UE 215 may correspond to the UE 1500 of FIG. 15 and may utilize one or more components, such as the processor 1502, the memory 1504, the sidelink configured grant module 1508, the sidelink multi-hop module 1509, the transceiver 1510, the modem 1512, and the one or more antennas 1516 with reference to FIG. 15, to execute the actions of the method 300. As illustrated, the method 300 includes a number of enumerated actions, but aspects of the method 300 may include additional action(s) before, after, and in between the enumerated action. In some aspects, one or more of the enumerated actions may be omitted or performed in a different order.

In the method 300, the BS 205 may serve the UEs 215a, 215b, and 215c over Uu links 202 as discussed above with reference to FIG. 2. The UE 215a may have data for transmission to the peer UE 215c. The UE 215b may be a sidelink relay UE that is positioned between the UE 215a and the UE 215c along a multi-hop path as shown in FIG. 2. The BS 205 may utilize mode-1 RRA to allocate resources for the UEs 215 for sidelink communication. In FIG. 3, the arrows with solid lines represent communications over a Uu link (e.g., the Uu links 202a, 202b, and 202c), and the arrows with dashed lines represent communications over a PC5 one-hop link (e.g., the PC5 one-hop links 204a and 204b).

At action 305, the UE 215a transmits, and the BS 205a receives (over the Uu link 202a), a first scheduling request for a sidelink transmission. The first scheduling request may be in the form of an SR or a BSR. The first scheduling request may indicate a number of data bytes that the UE 215a has for transmission to the UE 215b.

At action 310, in response to the first scheduling request, the BS 205 transmits, and the UE 215a receives (over the Uu link 202a), a first scheduling grant (e.g., a dynamic grant) indicating a resource allocation and/or transmit transmission parameters (e.g., MCS and/or transmit power parameters). For instance, the BS 205 may allocate a resource according to a data size (a number of data bytes) indicated by the first scheduling request. In some instances, the BS 205 may also determine the transmission parameters for the UE 215a, for example, based on channel information reported by the UE 215a. In some instances, the first scheduling grant may be in the form of a DCI format 3_0.

At action 315, the UE 215a transmits, and the UE 215b receives (over the PC5 one-hop link 204a), a first sidelink transmission in the resource and/or according to the transmission parameters indicated by the first scheduling request. The first sidelink transmission may include a data block (e.g., TB) destined for the UE 215c. The first sidelink transmission may include SCI in a PSCCH and the data block in a PSSCH. The SCI may include address information associated with the data block. The address information may facilitate multi-hop communication as will be discussed in greater detail with reference to FIG. 6 below.

At action 320, the UE 215b transmits, and the UE 215a receives (over the PC5 one-hop link 204a), a first sidelink feedback for the first sidelink transmission. The first sidelink feedback may be a HARQ ACK/NACK feedback communicated over a PSFCH. For instance, the UE 215a may utilize HARQ for transmitting the data block. As explained above, a receiving device may transmit a HARQ-ACK to indicate a successful reception and decoding of a data block or transmit a HARQ-NACK to indicate a failure to decode a data block. For instance, the UE 215b successfully decoded the data block from the first sidelink transmission. Accordingly, the first sidelink feedback may indicate a HARQ-ACK.

At action 325, in response to the first sidelink feedback, the UE 215a transmits, and the BS 205a receives (over the Uu link 202a), a first HARQ ACK/NACK. The UE 215a may forward the HARQ ACK/NACK received from the UE 215b at action 320. Thus, the first HARQ ACK/NACK may be a HARQ-ACK as received from the UE 215b.

The UE 215b may be configured to operate as a relay, for example, based on a routing configuration or a routing table as will be discussed in greater detail with reference to FIG.

6 below. Thus, upon receiving the first sidelink transmission including the data block, the UE 215b may determine to forward the data block based on the address information associated with the data block. Since sidelink operates in mode-1 RRA, the UE 215b may request for a transmission resource from the BS 205 for the relaying. As shown, at action 330, the UE 215b transmits, and the BS 205a receives (over the Uu link 202b), a second scheduling request for sidelink communication. The second scheduling request may be an SR or a BSR. The second scheduling request may indicate a number of data bytes according to a size of the data block for relaying.

At action 335, in response to the second scheduling request, the BS 205 transmits, and the UE 215b receives (over the Uu link 202b), a second scheduling grant (e.g., a dynamic grant) indicating a resource allocation and/or transmit transmission parameters (e.g., MCS and/or transmit power parameters). For instance, the BS 205 may allocate a resource according to a data size (a number of data bytes) indicated by the second scheduling request. In some instances, the BS 205 may also determine the transmission parameters for the UE 215b, for example, based on channel state reports reported by the UE 215b. In some instances, the second scheduling grant may be a DCI format 3_0.

At action 340, the UE 215b transmits, and the UE 215c receives (over the PC5 one-hop link 204b), a second sidelink transmission including the data block (for relaying) in the resource and/or according to the transmission parameters indicated by the second scheduling request. The second sidelink transmission may include SCI in a PSCCH and the data block in a PSSCH. The SCI may include address information associated with the data block as will be discussed in greater detail with reference to FIG. 6 below.

At action 345, the UE 215c transmits, and the UE 215b receives (over the PC5 one-hop link 204b), a second sidelink feedback for the second sidelink transmission. The second sidelink feedback may be a HARQ ACK/NACK feedback communicated over a PSFCH. For instance, the UE 215c successfully decoded the data block. Accordingly, the second sidelink feedback may indicate a HARQ-ACK.

At action 350, in response to the second sidelink feedback, the UE 215b transmits, and the BS 205a receives (over the Uu link 202b), a HARQ ACK/NACK. For instance, the second HARQ ACK/NACK may be a HARQ-ACK based on the second sidelink feedback.

While dynamic grants with sidelink mode-1 RRA can support multi-hop sidelink communications, a two-hop sidelink communication may utilize two scheduling requests (e.g., SRs and/or BSRs), two dynamic grants (e.g., DCI format 3_0), and two HARQ ACK/NACKs communicated over Uu links. The dynamic grants or DCI format 3_0 can be costly in terms of resource overhead and/or processing overhead. Further, the sidelink relay UE 215b may be expected to operate in a receiving mode at all time when operating as a sidelink relay UE. Accordingly, power consumption at the UE 215b can be high. While discontinuous reception (DRX) can be used to reduce power consumption at the UE 215b, operating DRX with dynamic grant (for sidelink mode-1 RRA) can be complex.

Accordingly, the present disclosure provides techniques for enhancing CGs to facilitate multi-hop sidelink communications. For example, a first UE operating as a sidelink relay UE may receive a CG from a BS. The CG may indicate a plurality of CG occasions, each including at least one transmit resource and an associated receive window. The transmit resource may be after the associated receive window. In this way, the first UE may monitor a receive window in a first CG occasion of the plurality of CG occasion for sidelink data to relay, and upon receiving sidelink data for delay, the first UE may utilize the transmit resource in the first CG occasion to forward the data to a next-hop UE.

Figure 4:
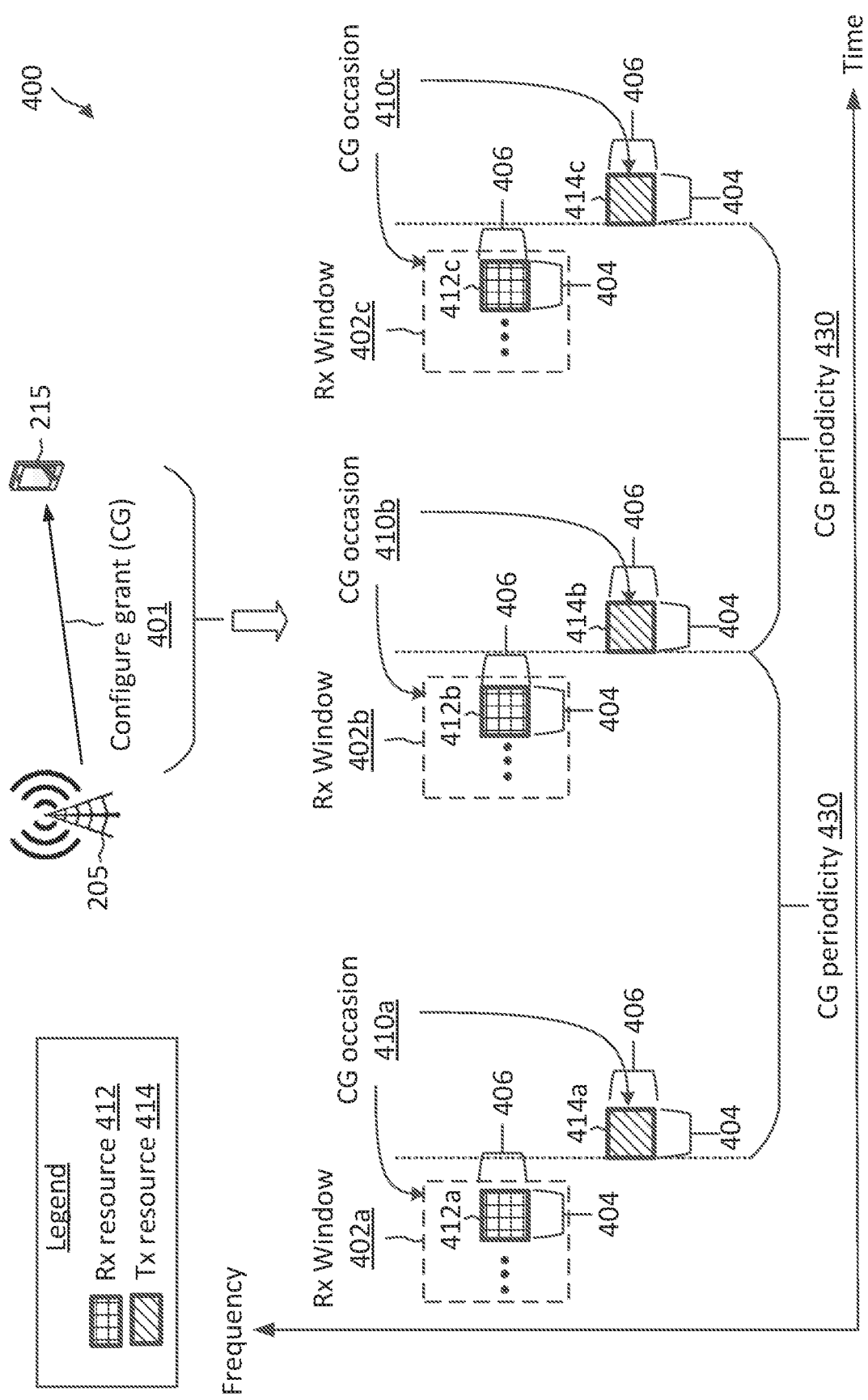
FIG. 4 illustrates a configured grant (CG) configuration scheme for multi-hop sidelink communication according to some aspects of the present disclosure.

FIG. 4 illustrates a CG configuration scheme 400 for multi-hop sidelink communication according to some aspects of the present disclosure. The scheme 400 may be employed by UEs such as the UEs 115 and 215 and/or BSs such as the BSs 105 and/or 205. In particular, a BS 205 may configure a sidelink relay UE 215 (e.g., the UE 215b) with a CG for relaying sidelink communications as shown in the scheme 400. In FIG. 4, the x-axis represents time in some arbitrary units, and the y-axis represents frequency in some arbitrary units.

In the scheme 400, a BS 205 may configure a sidelink relay UE 215 with a CG 401. The CG 401 may indicate a plurality of CG occasions 410. Each CG occasion 410 may include a transmit resource 414 and an associated receive window 402. Each receive window 402 may include one or more receive resources 412 (e.g., about 1, 2, 3, 4, 5, 6, 7, 8, 9, 10 or more). Each transmit resource 414 and each receive resource 412 may be a sidelink resource (e.g., a time-frequency resource). The transmit resources 414 and the receive resources 412 may be part of a sidelink resource pool. The sidelink resource pool may occupy a certain number of symbols in time and a certain number of subcarriers in frequency. In some instances, the sidelink resources pool may be partitioned into a plurality of slots 404 (including a plurality of symbols) in time and into a plurality of subchannels 406 (including a plurality of subcarriers) in frequency. For instance, each transmit resource 414 and each receive resource 412 may occupy one slot 404 in time and one subchannel 406 in frequency.

For simplicity, FIG. 4 illustrates three CG occasions 410a, 410b, and 410c, but a greater number of CG occasions 410 may be supported. The CG occasion 410a may include a transmit resource 414a and an associated receive window 402a including one or more receive resources 412a. The CG occasion 410b may include a transmit resource 414b and an associated receive window 402b including one or more receive resources 412b. The CG occasion 410c may include a transmit resource 414c and an associated receive window 402c including one or more receive resources 412c. Each transmit resource 414 in a CG occasion is preceded by a receive window 402.

This resource arrangement can facilitate sidelink relay operations. For instance, for each CG occasion 410, the sidelink relay UE 215 (e.g., the UE 215b in FIG. 2) may monitor the receive window 402 for sidelink data (e.g., a PSSCH signal including a TB) to be relayed to a next-hop UE 215 or a destination UE 215 (e.g., the UE 215c in FIG. 3). If the sidelink relay UE 215 successfully decoded a PSSCH signal from the receive window 402, for example, based on a cyclic redundancy check (CRC) pass, the sidelink relay UE 215 may relay the PSSCH signal using the transmit resource 414 in the same CG occasion 410. That is, the receive resource(s) 412 in a CG occasion 410 may be used by the sidelink relay UE 215 to receive sidelink data from a previous-hop UE 215 along a multi-hop sidelink path and the associated transmit resource 414 in the same CG occasion 410 may be used by the sidelink relay UE 215 to transmit or relay the sidelink data to a next-hop UE 215 along the multi-hop sidelink path.

As an example, if the sidelink relay UE 215 receives sidelink data (e.g., PSSCH signal including a TB) for relaying in the receive resource 412a within the receive window 402a of the CG occasion 410a, the sidelink relay UE 215 may forward the received sidelink data in the following transmit resource 414a. Similarly, if the sidelink relay UE 215 receives sidelink data (e.g., PSSCH signal) for relaying in the receive resource 412b within the receive window 402b of the CG occasion 410b, the sidelink relay UE 215 may forward the received sidelink data in the following transmit resource 414b. If the sidelink relay UE 215 receives sidelink data (e.g., PSSCH signal) for relaying in the receive resource 412c within the receive window 402c of the CG occasion 410c, the sidelink relay UE 215 may forward the received sidelink data in the following transmit resource 414c.

In some aspects, the sidelink relay UE 215 may forward or relay a TB that is valid for relaying. As explained above, a sidelink transmission can include address information associated with the TB. The sidelink relay UE 215 may determine whether a TB received in a receive window 402 is valid for relaying based on the address information associated with the TB. The address information will be discussed more fully below with reference to FIG. 6.

In some aspects, the BS 205 may indicate a CG periodicity 430 (e.g., T seconds) for the CG 401. Accordingly, the CG occasions 410 can be repeated every T seconds. In some aspects, the CG periodicity 430 can be defined with respect to the start of the transmit resources 414 as shown. In other aspects, the CG periodicity 430 can be defined with respect to the start of the receive windows 402, for example.

In some aspects, the BS 205 may transmit an indication of the CG 401 to the sidelink relay UE 215, for example, via an RRC configuration, where the CG 401 may indicate sidelink subchannels and/or sidelink slot information for the CG occasions 410 and the CG periodicity 430. In some aspects, the CG 401 may be a type-1 CG, and the sidelink relay UE 215 may start to utilize the CG occasions 410 upon receiving the CG 401. In other aspects, the CG 401 may be a type-2 CG, and the sidelink relay UE 215 may start to utilize the CG occasions 410 after receiving an activation for the CG 401, for example, via an activation DCI.

While FIG. 4 illustrates the receive resources 412 or the receive windows 402 occupying different subchannels 406 than an associated transmit resource 414 and spaced apart in time from the associated transmit resource 414, aspects are not limited thereto. In general, a transmit resource 414 and an associated receive window 402 in a CG occasion 410 can be arranged in any suitable manner. For instance, the transmit resource 414 can be located at the same subchannel as one of the receive resource 412. Further, in some instances, the transmit resource 414 may be spaced apart from the receive window by any suitable time gap (e.g., a few symbols, or 1, 2, or 3 sidelink slots 404). Further, in some aspects, the BS 205 may also configure one or more additional transmit resources similar to the transmit resource 414 for each CG occasion 410 as will discussed more fully below with reference to FIGS.

As can be seen from the scheme 400, since the sidelink relay UE 215 may have information about the time location of each CG occasion 410 once the CG 401 is being configured or activated, the sidelink relay UE 215 can enter a low-power mode or sleep mode between the CG occasions 410 to save power instead of having to stay awake (active) at all time when dynamic grants are used for multi-hop relay as discussed above.

In some aspects, the BS 205 may configure each UE 215 along a multi-hop sidelink path participating in the relay with a CG similar to the CG 401 and including CG occasions similar to the CG occasions 410 (each with a transmit resource 414 and an associated receive window 402). For example, the BS 205 may utilize the scheme 400 to configure sidelink UEs 215 to provision for sidelink with a mesh-topology as shown in FIG. 5.

Figure 5:
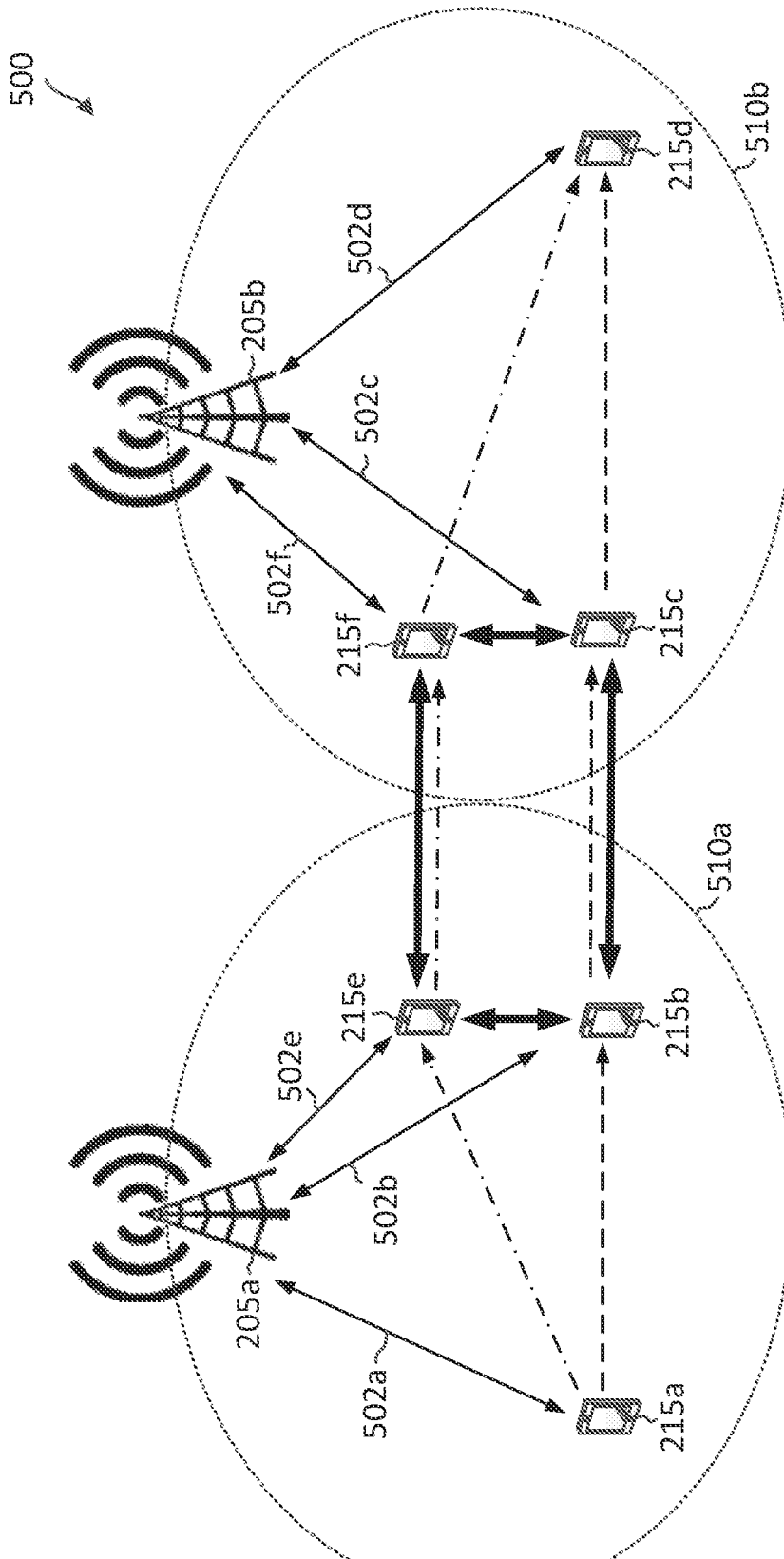
FIG. 5 illustrates a CG-based multi-hop sidelink communication scenario according to some aspects of the present disclosure.
Figure 5:
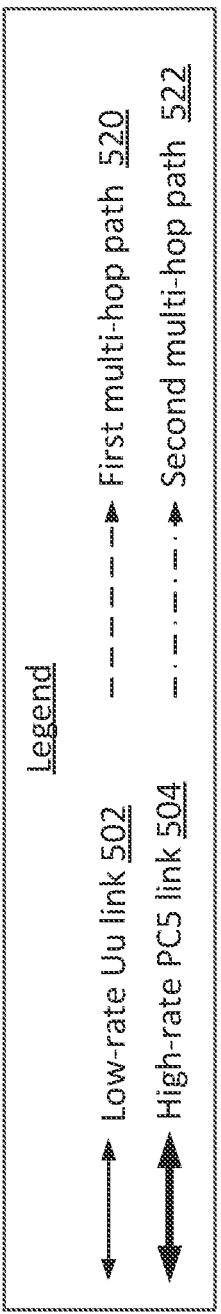

FIG. 5 illustrates a CG-based multi-hop sidelink communication scenario 500 according to some aspects of the present disclosure. In some aspects, the communication scenario 500 may correspond to a communication scenario among BSs 105 and or UEs 115 in the network 100. For simplicity, FIG. 5 illustrates two BSs 205 and six UEs 215 (shown as 215a, 215b, and 215c), but a less number of UEs 215 (e.g., 4, 5) or a greater number of UEs 215 (e.g., about 7, 8, 9, 10 or more) and/or a greater number of BSs 205 (e.g., about 3, 4 or more) may be supported.

In the scenario 500, the BS 205a may serve the UEs 215a, 215b, and 215e within a coverage 510a of the BS 205a via corresponding low-rate Uu links 502 (shown by the thin solid lines with arrows). Similarly, the BS 205b may serve the UEs 215c, 215d, and 215f within a coverage 510b of the BS 205b via corresponding Uu links 502 (shown by the thin solid lines with arrows). As shown, the UE 215a, the UE 215b, and the UE 215e may communicate with the BS 205 via the Uu link 502a, the Uu link 502b, and the Uu link 502e, respectively. The UE 215c, the UE 215d, and the UE 215f may communicate with the BS 205 via the Uu link 502c, the Uu link 502b, and the Uu link 502e, respectively. The UEs 215b, 215c, 215e, and 215f may communicate with each other via high-rate PC5 links 504 (shown by the thick solid lines with arrows). In some aspects, the low-rate Uu links 502 may be over a lower-frequency band than the high-rate PC5 links 504. In some aspects, the high-rate PC5 links 504 may be over a high-frequency band such as a 60 GHz band. Accordingly, the high-rate PC5 links 504 may provide a high data rate than the low-rate Uu links 502. In some instances, the UEs 215b, 215c, 215e, and 215f may utilize beamforming to form narrow, directional beams to communicate with each other. For example, the UE 215b may have a line-of-sight (LOS) path to the UE 215c and a LOS path to the UE 215e, the UE 215f may have a LOS path to the UE 215e and a LOS path to the UE 215c, and so on. As such, the UEs 215b, 215c, 215e, and 215f together form a mesh topology. In some aspects, the UEs 215b, 215c, 215e, and 215f may utilize a mesh protocol for communications. In some aspects, the mesh topology may also provide multi-paths, which may be useful for communications over high-frequency unlicensed bands.

In some aspects, the UE 215a may desire to transmit to the UE 215d over a high-rate PC5 link. The UE 215a may not be able to reach the UE 215d directly. However, the UE 215a may utilize one or more of the UEs 215b, 215c, 215e, and 215f as relays to reach the UE 215d with high-rate links 504. In the illustrated example of FIG. 5, the UE 215a may utilize a first multi-hop path 520 including the UE 215a, the UE 215b, the UE 215c, and the UE 215d (shown by the dashed line) to communicate with the UE 215d. That is, the UE 215a may transmit a TB destined for the UE 215d along the first multi-hop path 520, where each of the UE 215b and the UE 215c may assist in relaying the TB to the UE 215d. Alternatively, the UE 215a may utilize a second multi-hop path 522 including the UE 215a, the UE 215e, the UE 215f, and the UE 215d (shown by the dashed-dotted line) to communicate with the UE 215d. That is, the UE 215a may transmit a TB destined for the UE 215d along the second multi-hop path 522, where each of the UE 215e and the UE 215f may assist in relaying the TB to the UE 215d.

In some aspects, the BS 205a may configure each of the served UEs 215b and 215e to assist in relaying sidelink with a CG similar to the CG 401 and including CG occasions similar to the CG occasions 410 (each with a transmit resource 414 and an associated receive window 402) for sidelink relay operations. Similarly, the BS 205b may configure each of the served UEs 215c and 215f to assist in relaying sidelink with a CG similar to the CG 401 and including CG occasions similar to the CG occasions 410 (each with a transmit resource 414 and an associated receive window 402) for multi-hop sidelink relay operations as discussed above with reference to FIG. 4. Each of the UE 215b, 215c, 215e, and 215f may monitor for a TB for relaying in a receive window of each respective CG occasion and forward the TB using a corresponding transmit resource in the same CG occasion as discussed above with reference to FIG. 4.

Figure 6:
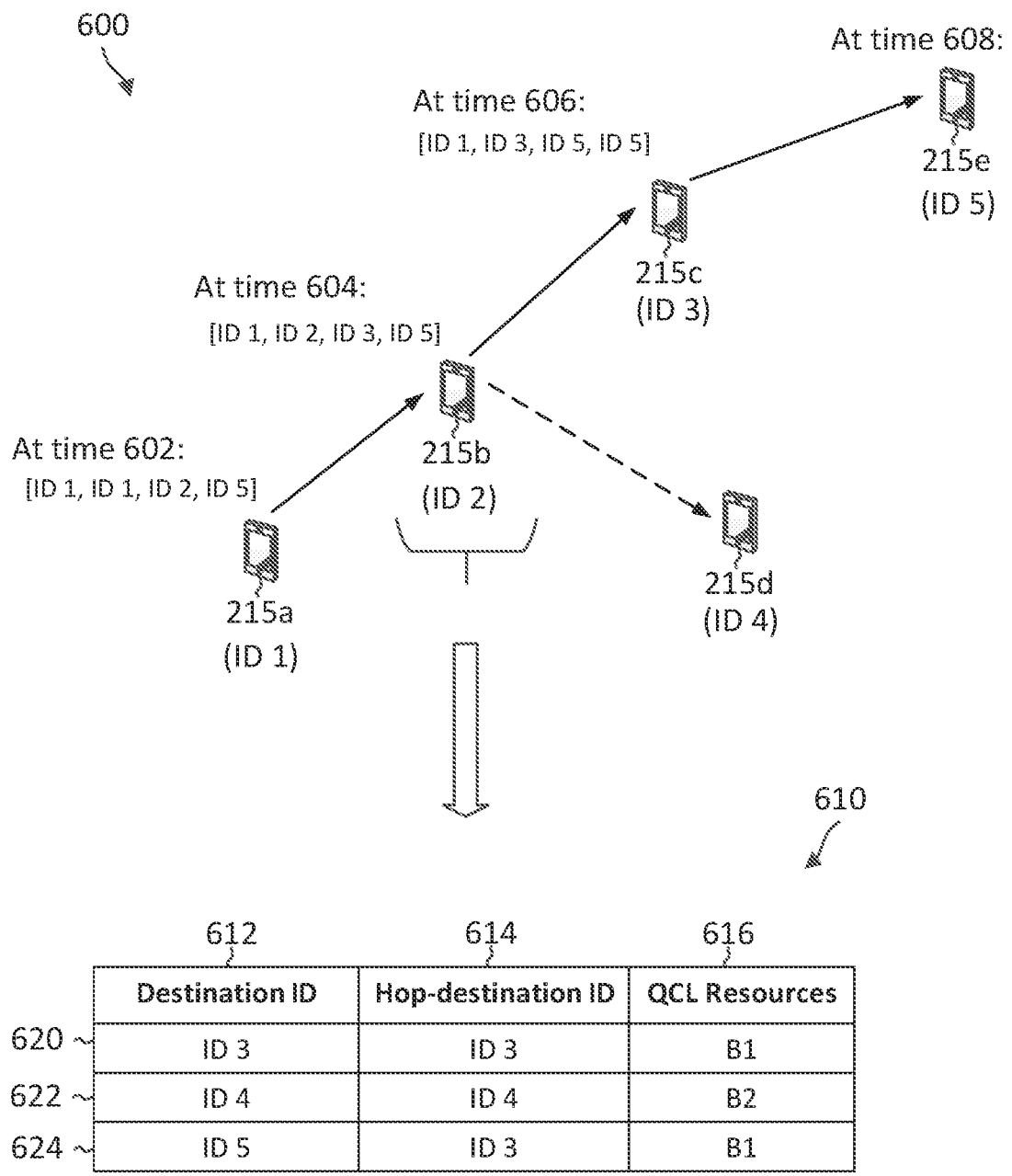
FIG. 6 illustrates a CG-based multi-hop sidelink addressing and routing scheme according to some aspects of the present disclosure.

FIG. 6 illustrates a CG-based multi-hop sidelink addressing and routing scheme 600 according to some aspects of the present disclosure. The scheme 600 may be employed by UEs such as the UEs 115 and 215. In particular, the UEs 215 may include address information for each data block (e.g., a TB) to be communicated over a multi-hop sidelink path (e.g., the multi-hop paths 520 and 522) and/or route the data block as shown in the scheme 600. The scheme 600 can be used in conjunction with the scheme 400 discussed above with reference to FIG. 4 and/or the sidelink mesh topology mesh discussed above with reference to FIG. 5.

In the scheme 600, a data block for relaying may be attached with a 4-address vector, denoted as [source ID, hop-source ID, hop-destination ID, destination ID]. The source ID may identify a UE 215 that initiated the transmission of the data block along a multi-hop path. The hop-source ID may identify a previous-hop UE 215 in the multi-hop path. The hop-destination ID may identify a next-hop UE 215 in the multi-hop path. The destination ID may identify a target sidelink receiving UE 215 for the data block. In some aspects, the source ID, the hop-source ID, the hop-destination ID, and the destination ID may be layer 2 (L2) IDs. In some aspects, the source ID, the hop-source ID, the hop-destination ID, and the destination ID may be partially included in SCI of a sidelink transmission. For instance, the SCI may include a portion (e.g., about 8 bits or 16 bits) of each of the source ID, the hop-source ID, the hop-destination ID, and/or the destination ID, and the complete or full source ID, the complete or full hop-source ID, the complete or full hop-destination ID, and the complete or full destination ID may be included in a medium access control (MAC) header associated with the data block (transmitted over a PSSCH).

For simplicity, FIG. 6 illustrates five UEs 215a, 215b, 215c, 215d, and 215e performing multi-hop sidelink operations, but a less number of UEs 215 (e.g., about 3 or 4) or a greater number of UEs 215 (e.g., 6, 7, 8, or more) may be supported. As an example, the UEs 215a, 215b, 215c, 215d, and 215e may be identified by ID 1, ID 2, ID 3, ID 4, and ID 5, respectively. In FIG. 6, the solid lines with arrows may represent a first multi-hop path, and the dashed line with arrow may represent a second multi-hop path. At time 602, the UE 215a may generate a TB for transmission to the UE 215e. The UE 215a may transmit, and the UE 215b may receive, a first sidelink transmission including the data block and a first address vector [ID 1, ID 1, ID 2, and ID 5].

At time 604, upon receiving the first sidelink transmission from the UE 215a, the UE 215b may relay the data block to a next-hop UE 215c. In some aspects, the UE 215b may determine whether the data block from the first sidelink transmission is valid for relaying based on the first address vector in the first sidelink transmission. For instance, the UE 215b may determine the data block is valid for relaying when there is a match between the hop-destination ID in the first address vector and an ID of the UE 215b. Further, the UE 215b may determine the data block is valid for relaying if the destination ID in the first address vector is within a set of one or more destination IDs for relaying by the UE 215b. In some instances, the UE 215b may be configured with a set of destination IDs for relaying by a BS 205 (e.g., via RRC or MAC-CE signaling). The UE 215b may update the address vector with the hop-source ID identifying the UE 215b and the hop-destination ID identifying the UE 215c. For instance, the UE 215b may transmit a second sidelink transmission including the data block and a second address vector [ID 1, ID 2, ID 3, and ID 5].

At time 606, upon receiving the second sidelink transmission from the UE 215b, the UE 215c may relay the data block to a next-hop UE 215e (the destination UE 215e). For instance, the UE 215c may determine the data block in the second sidelink transmission is valid for relaying when there is a match between the hop-destination ID in the second address vector and an ID of the UE 215c and/or the destination ID in the second address vector is within a set of one or more destination IDs for relaying by the UE 215c. In some instances, the UE 215c may be configured with a set of destination IDs for relaying by a BS 205 (e.g., via RRC or MAC-CE signaling). The UE 215c may update the address vector with the hop-source ID identifying the UE 215c and the hop-destination ID identifying the UE 215e. For instance, the UE 215c may transmit a third sidelink transmission including the data block and a third address vector [ID 1, ID 3, ID 5, and ID 5].

At time 608, upon receiving the third sidelink transmission from the UE 215c, the UE 215e may determine that that the UE 215e is the target receiver for the data block, for example, based on the destination ID in the third address vector identifying the UE 215e.

In some aspects, a sidelink relay UE 215 may perform routing for multi-hop sidelink according to a routing table (e.g., a L2 routing table), which may be configured by a serving BS 205 (e.g., via RRC or MAC-CE signaling). In some aspects, the routing table can be fully configured by the serving BS 205. In other aspects, the routing table may be partially configured by the serving BS 205 and the UE 215 may update certain routing information (e.g., a next hop destination and/or a beam direction) in the routing table 610.

In the illustrated example of FIG. 6, the UE 215b is configured with a routing table 610. The routing table 610 includes a column 612 indicating destination IDs, a column 614 indicating hop-destination IDs, and a column 616 indicating QCL sources. Each row is a routing configuration entry. Each row indicates that if the UE 215b receives a multi-hop data block (for relay) associated with a destination ID corresponding to the destination ID in the row, the UE 215b may forward the multi-hop data block to a next-hop UE 215 identified by the hop-destination ID in the row. In some aspects, the UE 215b may also transmit the multi-hop data block (during relay) utilizing transmit beamforming in a beam direction specified by the QCL resource in the same row. Multi-hop sidelink with beamforming will be discussed more fully below with reference to FIGS. 9-12.

In operation, if the UE 215b receives a multi-hop data block (a valid TB for relaying), the UE 215b may look up the routing table 610 with an entry including a destination ID corresponding to the destination ID associated with the multi-hop data block. The UE 215b may forward the multi-hop data block to a next-hop UE 215 identified by the hop-destination ID in the that entry or row and in a beam direction indicated by the QCL source in that same entry. For example, if the UE 215*b* receives a multi-hop data block with a destination ID of ID 3, the UE 215*b* may forward the multi-hop data block to the UE 215*c* identified by the ID 3 in a beam direction B1 as configured by the row 620 in the routing table 610. If the UE 215*b* receives a multi-hop data block with a destination ID of ID 4, the UE 215*b* may forward the multi-hop data block to the UE 215*d* identified by the ID 4 in a beam direction B2 (e.g., different from B1) as configured by the row 622 in the routing table 610. If the UE 215*b* receives a multi-hop data block with a destination ID of ID 5 (the UE 215*e*), the UE 215*b* may forward the multi-hop data block to the UE 215*c* identified by the ID 3 in a beam direction B1 as configured by the row 624 in the routing table 610.

Figure 7:
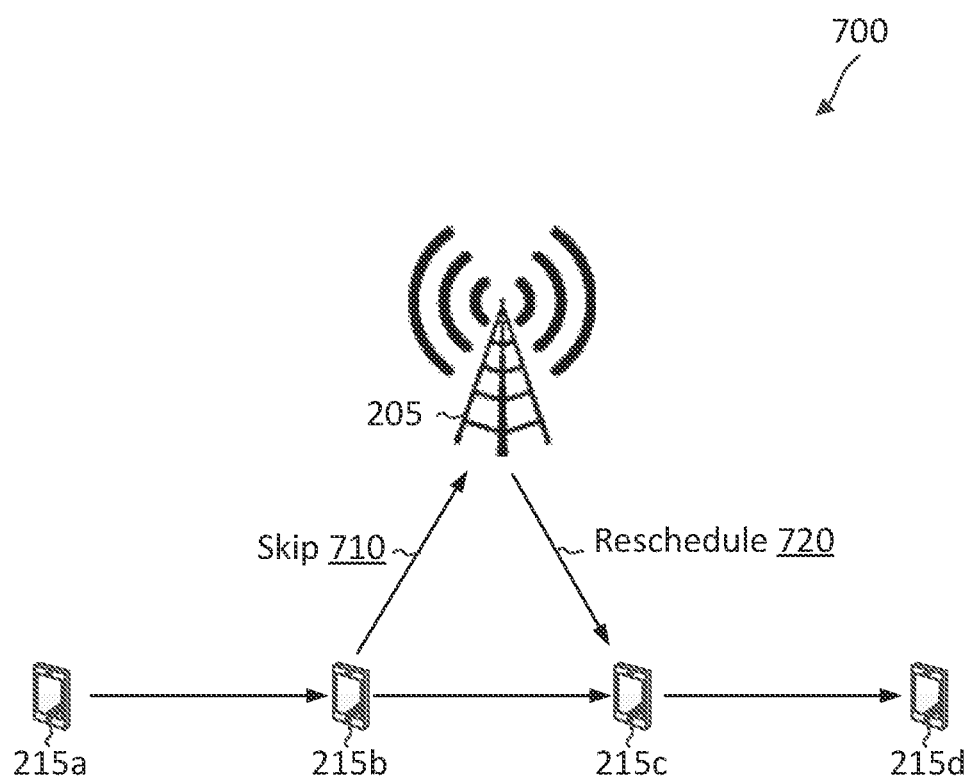
FIG. 7 illustrates a CG-based multi-hop sidelink communication scheme according to some aspects of the present disclosure.

FIG. 7 illustrates a CG-based multi-hop sidelink communication scheme 700 according to some aspects of the present disclosure. The scheme 700 may be employed by UEs such as the UEs 115 and 215 and BSs such as the BSs 105 and 205. In particular, a UE 215 may communicate a multi-hop relay status with a serving BS 205 as shown in the scheme 700. The scheme 700 can be used in conjunction with the schemes 400 and/or 600 discussed above with reference to FIGS. 4 and/or 6, respectively, and/or the sidelink mesh topology mesh discussed above with reference to FIG. 5.

As shown in FIG. 7, a UE 215*a* may transmit to a UE 215*d* over a multi-hop path with a UE 215*b* and a UE 215*c* positioned between the UE 215*a* and the UE 215*d* along the multi-hop path. The UE 215*b* and the UE 215*c* may be served by the BS 205. The BS 205 may configure each of the UE 215*b* and the UE 215*c* with a CG similar to the CG 401 and including CG occasions similar to the CG occasions 410 (each with a transmit resource 414 and an associated receive window 402) for multi-hop sidelink relay operations as discussed above with reference to FIG. 4.

In the scheme 700, the BS 205 may further configure the sidelink relay UE 215*b* and the UE 215*c* to provide a multi-hop relay status to the BS 205. For instance, the BS 205 may configure the sidelink relay UE 215*b* to transmit a skip indication 710 to the BS 205 (over a Uu link such as the Uu links 202 and 502) if the sidelink relay UE 215*b* fails to receive a valid data block (e.g., a valid TB) within a receive window (e.g., the receive windows 402) of a CG occasion (e.g., the CG occasions 410). As an example, the UE 215*b* may monitor a receive window of a CG occasion and may fail to detect a data block in the receive window for relaying. In some instances, the first UE may fail to decode SCI and/or a data block (PSSCH data) successfully in the receive window. In other instances, the first UE may successfully decode SCI and a data block (PSSCH data) in the receive window, but the data block is not for relaying by the first UE (e.g., with a hop-destination ID identifying a different UE than the second UE and/or with a destination ID that is not within a set of destination IDs for relaying by the first UE). Accordingly, the UE 215*b* mat transmit the skip indication 710 to indicate the failure in detecting a data block for relaying. In some aspects, the UE 215*b* may transmit the skip indication 710 as a NACK indication over a PUCCH, for example, utilizing similar mechanisms as a HARQ-NACK transmission.

In some aspects, upon receiving the skip indication 710, the BS 205 may reschedule the pre-configured transmit resource (e.g., the transmit resources 414) in the CG occasion for another UE 215 to use for transmission. For instance, the BS 205 may re-schedule the pre-configured transmit resource for the UE 215*c*, for example, by transmitting a reschedule indication 720 to the UE 215*c* (as a DCI over a Uu link such as the Uu links 202 and 502). In some aspects, the CG occasion may include multiple preconfigured transmit resources spaced associated with the receive window and spaced apart in time (e.g., to allow for retransmissions), and the BS 205 may reschedule at least one of the later transmit resources in the CG occasion for the UE 215*c*.

Figure 8:
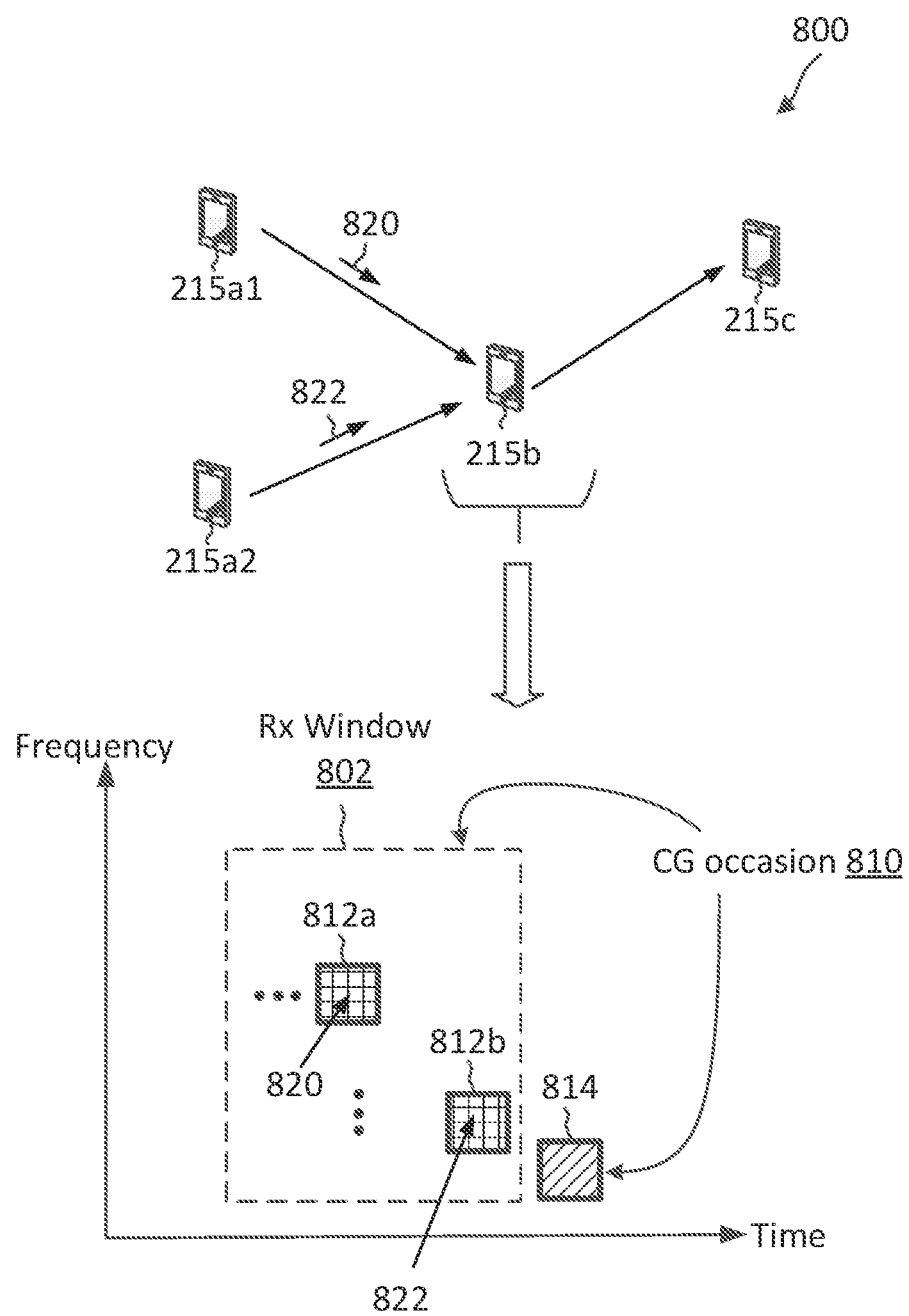
FIG. 8 illustrates a CG-based multi-hop sidelink communication scheme according to some aspects of the present disclosure.

FIG. 8 illustrates a CG-based multi-hop sidelink communication scheme 800 according to some aspects of the present disclosure. The scheme 800 may be employed by UEs such as the UEs 115 and 215 and BSs such as the BSs 105 and 205. In particular, a UE 215 may prioritize TBs for relaying in multi-hop sidelink as shown in the scheme 800. The scheme 800 can be used in conjunction with the schemes 400, 600, and/or 700 discussed above with reference to FIGS. 4, 6, and/or 7, respectively, and/or the sidelink mesh topology mesh discussed above with reference to FIG. 5. In FIG. 8, the x-axis represents time in some arbitrary units, and the y-axis represents frequency in some arbitrary units.

In the scheme 800, UEs 215*a*1, 215*a*2, 215*b*, and 215*c* may be configured by a serving BS (e.g., a BS 105 or 205) to operate as sidelink relay UEs. The UE 215*b* may be in communication with previous-hop UEs 215*a*1 and UE 215*a*2 and a next-hop UE 215*c* for multi-hop sidelink operations. For instance, the UE 215*b* may be configured by the serving BS with a CG similar to the CG 401 and including CG occasions 810 similar to the CG occasions 410. For simplicity, FIG. 8 illustrates one CG occasion 810, but the CG occasion 810 may be repeated over time. The CG occasion 810 includes a transmit resource 814 and an associated receive window 802 including a plurality of receive resources 812 (shown as 812*a* and 812*b*). The transmit resource 814, the receive window 802, and the receive resources 812 may be similar to the transmit resource 414, the receive window 402, and the receive resources 412, respectively.

The UE 215*b* may monitor the receive window 802 for a data block (e.g., TB) for relaying. The UE 215*b* may detect a sidelink transmission 820 in the receive resource 812*a* and may successfully decodes a first data block from the sidelink transmission 820. The UE 215*b* may determine that the first data block in the sidelink transmission 820 is a valid data block for relaying, for example, based on a hop-destination ID associated with the data block matches an ID of the UE 215*b* and/or a destination ID associated with the data block being within a set of destination IDs for relaying by the UE 215*b*. Further, the UE 215*b* may detect a sidelink transmission 822 in the receive resource 812*b* and may successfully decodes a second TB from the sidelink transmission 822. The UE 215*b* may determine that the second data block in the sidelink transmission 822 is a valid data block for relaying, for example, based on a hop-destination ID associated with the second data block matches the UE 215*b*'s ID and/or a destination ID associated with the second data block being within a set of destination IDs for relaying by the UE 215*b*.

In some aspects, when the UE 215*b* detects more than one valid data block in the receive window 802 for relaying, the UE 215*b* may select a data block with a highest priority among the valid data block and utilize the transmit resource 814 to transmit the highest priority data block. For instance, the second data block from the sidelink transmission 822 may have a higher priority than the first data block from the sidelink transmission 820. Accordingly, the UE 215*b* may utilize the transmit resource 814 to forward the second data block.

In some aspects, when the UE 215b detects more than one valid data block in the receive window 802 with the same priority, the UE 215b may utilize the transmit resource 814 to transmit the earliest successfully received data block. Since the UE 215b receives the sidelink transmission 820 before the sidelink transmission 822, the UE 215b may utilize the transmit resource 814 to forward the first data block.

In some aspects, it may desirable for the BS to configure multiple UEs 215 to forward the same data block to the same UE 215, for example, when sidelink communications are over an unlicensed band where LBT operations may gate a sidelink transmission. For instance, the BS may configure or schedule the UE 215a1 and the UE 215a2 to transmit a data block to the UE 215b for relaying to the UE 215c. The configuring of multiple UEs 215 to transmit the same data block to a sidelink relay UE 215 for forwarding may be referred to as statistical multiplexing. For example, one of the UE 215a1 or the UE 215a2 may fail to gain access to the channel, but the other one of the UE 215a1 or the UE 215a2 may be successful in gaining access to the channel to transmit the data block to the UE 215b. The UE 215b may forward the data block to the UE 215c. The statistical multiplexing used by the serving BS along with the data block prioritization for relay at the UE 215b can allow for better utilization of relay opportunity at the UE 215b.

In some aspects, a sidelink relay UE 215 may be configured with a QCL source for reception in a receive window (e.g., the receive windows 402 and/or 802) of a CG occasion (e.g., the CG occasions 410 and/or 810), for example, when operating over a high-frequency band such as a 60 GHz band. The QCL source may indicate a certain beam direction. Further, in some aspects, the sidelink relay UE 215 may be configured with two more QCL sources for reception in the receive window as discussed below with reference to FIGS. 9 and 10.

Figure 9:
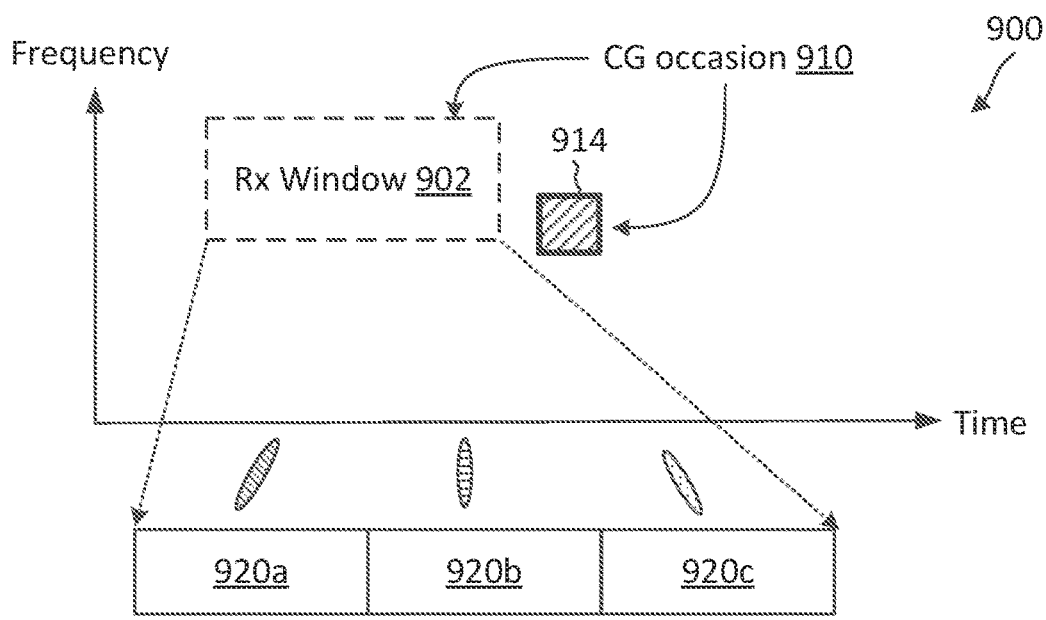
FIG. 9 illustrates a CG-based multi-hop sidelink communication scheme with receive beamforming according to some aspects of the present disclosure.

FIG. 9 illustrates a CG-based multi-hop sidelink communication scheme 900 with receive beamforming according to some aspects of the present disclosure. The scheme 900 may be employed by UEs such as the UEs 115 and 215. In particular, a UE 215 may perform block beam-sweep for reception in a receive window of a CG occasion as shown in the scheme 900. The scheme 900 can be used in conjunction with the schemes 400, 600, 700, and/or 800 discussed above with reference to FIGS. 4, 6, 7, and/or 8, respectively, and/or the sidelink mesh topology mesh discussed above with reference to FIG. 5. In FIG. 9, the x-axis represents time in some arbitrary units, and the y-axis represents frequency in some arbitrary units.

In scheme 900, a UE 215b may be configured, for example by a serving BS (e.g., a BS 105 or 205), to operate as a sidelink relay UE and with a CG similar to the CG 401 and including CG occasions 910 similar to the CG occasions 410 and 810. For simplicity, FIG. 9 illustrates one CG occasion 910, but the CG occasion 910 may be repeated over time. The CG occasion 910 includes a transmit resource 914 and an associated receive window 902 including a plurality of receive resources 912 (shown as 912a and 912b). The transmit resource 914, the receive window 902, and the receive resources 912 may be similar to the transmit resources 414 and 814, the receive windows 402 and 802, and the receive resources 412 and 812, respectively. The UE 215b may be configured with directional QCL source for reception in the receive window 902. For instance, the UE 215b may be configured (e.g., by the serving BS) to monitor the receive window 902 in certain beam direction(s). The UE 215b may configure antenna elements (e.g., the antennas 1516) at the UE 215b to beamform in a certain beam direction for reception in a certain time period.

In some aspects, the UE 215b may be configured to sweep across a set of beams for reception in the received window 902. In the illustrated example of FIG. 9, the UE 215b may be configured to sweep across three beams 904, 906, and 908 for reception in the receive window 902. However, the UE 215b can be configured to sweep across a greater number of beams (e.g., about 4, 5, 6 more) for reception in the receive window 902. In the scheme 900, the UE 215b may perform block sweeping. For instance, the receive window 902 may be partitioned into a number of sub-windows 920 (shown as 920a, 920b, 920c), for example, according to the number of beams in the set. Each sub-window 920 may include multiple slots (e.g., the slots 404). The UE 215b may perform monitoring and reception in each sub-window using one of the beams over the multiple slots. As shown, the receive window 902 is partitioned into three sub-windows 920a, 920b, and 920c, and the UE 215b may perform receptions in the sub-window 920a, 920b, and 902c using the beam 904, 906, and 908, respectively.

Figure 10:
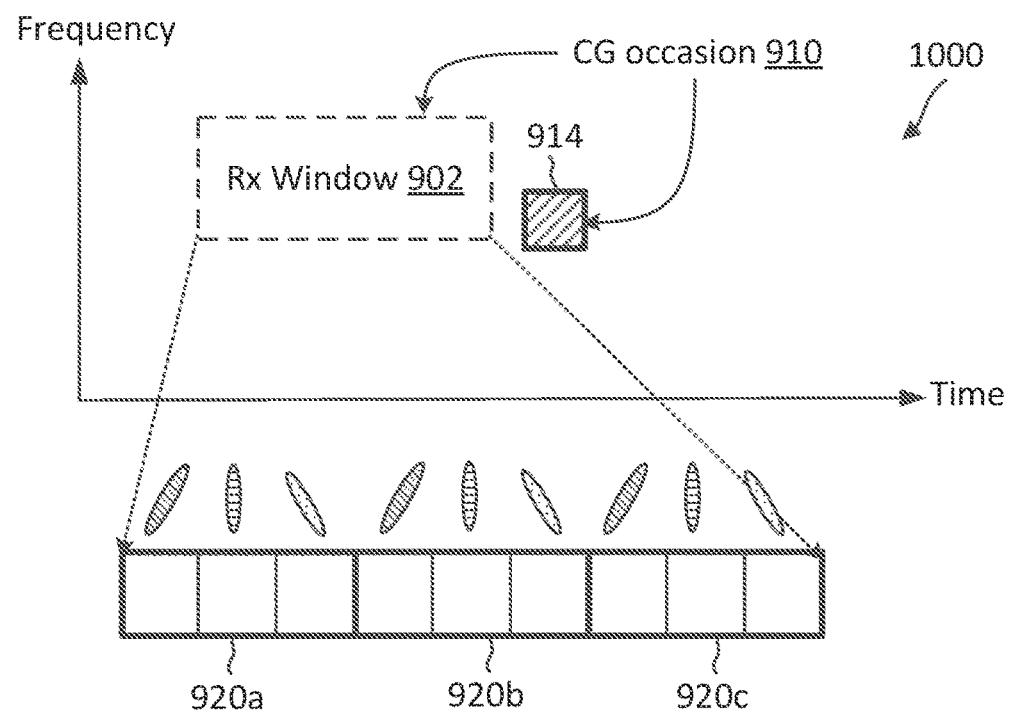
FIG. 10 illustrates a CG-based multi-hop sidelink communication scheme with receive beamforming according to some aspects of the present disclosure.

FIG. 10 illustrates a CG-based multi-hop sidelink communication scheme 1000 with receive beamforming according to some aspects of the present disclosure. The scheme 1000 may be employed by UEs such as the UEs 115 and 215. In particular, a UE 215 may perform interleaved beamsweep for reception in a receive window of a CG occasion as shown in the scheme 1000. The scheme 1000 can be used in conjunction with the schemes 400, 600, 700, and/or 800 discussed above with reference to FIGS. 4, 6, 7, and/or 8. In FIG. 10, the x-axis represents time in some arbitrary units, and the y-axis represents frequency in some arbitrary units. The scheme 1000 is illustrated using the same CG occasion as the scheme 900 of FIG. 9. However, in the scheme 1000, the UE 215b may be configured to perform interleaved-beam sweeping within each sub-window 920. As shown, the UE 215b may perform receptions in the sub-window 920a by sweeping across the set of beams 904, 906, and 908 in each sub-window 920a, 920b, and 920c. For instance, the UE 215b may switch to a different beam for each slot within a sub-windows 920a, 920b, and/or 920c.

In some aspects, a serving BS (e.g., the BSs 105 and/or 205) may configure a sidelink relay UE (e.g., the UEs 115 and/or 215) with a QCL source for transmitting in a transmit resource (e.g., the transmit resource 414, 814, and 914) of a CG occasion (e.g., the CG occasions 410 and/or 810), for example, when operating over a high-frequency band such as a 60 GHz band. Further, in some aspects, the serving BS may configure the sidelink relay UE with destination-aware QCL sources for transmitting in CG transmit resources for multi-hop sidelink as discussed below with reference to FIGS. 11 and 12.

Figure 11:
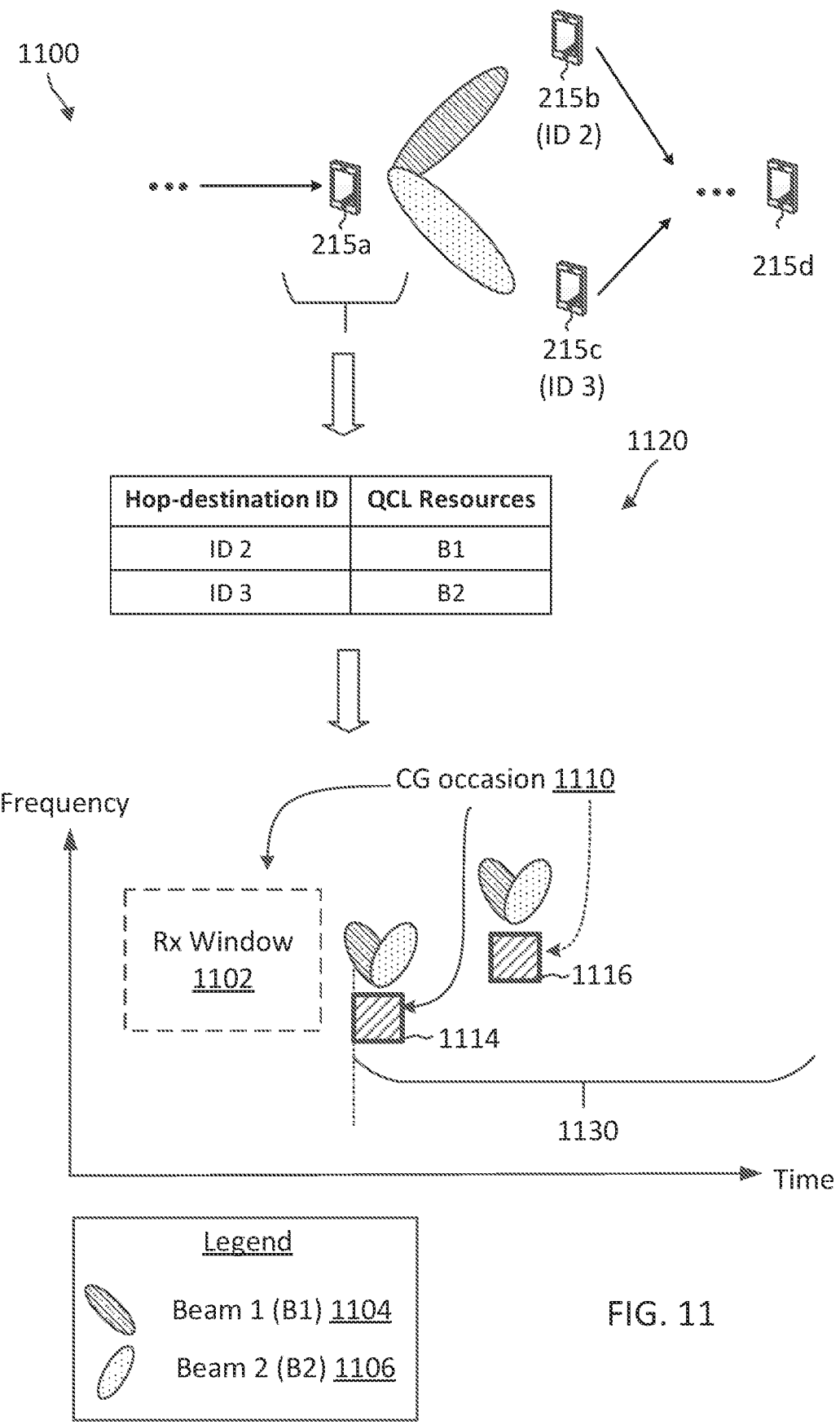
FIG. 11 illustrates a CG-based multi-hop sidelink communication scheme with transmit beamforming according to some aspects of the present disclosure.

FIG. 11 illustrates a CG-based multi-hop sidelink communication scheme 1100 with transmit beamforming according to some aspects of the present disclosure. The scheme 1100 may be employed by UEs such as the UEs 115 and 215. In particular, a UE 215 may apply transmit beamforming to transmit data to a next-hop UE along a multi-hop sidelink path as shown in the scheme 1100. The scheme 1100 can be used in conjunction with the schemes 400, 600, 700, 800, 900, and/or 1000 discussed above with reference to FIGS. 4, 6, 7, 8, 9, and/or 10, respectively, and/or the sidelink mesh topology mesh discussed above with reference to FIG. 5. In FIG. 11, the x-axis represents time in some arbitrary units, and the y-axis represents frequency in some arbitrary units.

In the scheme 1100, UEs 215a, 215b, and/or 215c may be configured by a serving BS (e.g., the BSs 105 and/or 205) to operate as sidelink relay UEs. For instance, the UE 215a may forward data to a next-hop UE 215b and/or a next-hop UE 215c for multi-hop sidelink operations. The UE 215a may utilize transmit beamforming to form narrow, directional transmission beams for transmitting sidelink data to the UE 215b and/or the UE 215. For instance, the UE 215a may configure antenna elements (e.g., the antennas 1516) at the UE 215a to generate a number of transmission beams in a number of different beam directions (e.g., about 2, 3, 4, 5, 6, 7, 8 or more). In the illustrated example of FIG. 11, the UE 215a may generate a beam B1 1104 (shown by the diagonal striped beam) for transmitting to the UE 215b in a direction towards the UE 215b. Similarly, the UE 215a may generate a beam B2 1106 (shown by the dot-pattern-filled beam) for transmitting to the UE 215c in a direction towards the UE 215c.

In some aspects, the UE 215a may be configured with different QCL sources for transmitting to the UE 215b and to the UE 215c. For instance, the serving BS may configure the UE 215a with a routing table 1120 including a mapping between hop-destination IDs and QCL sources. For instance, the UE 215b may be identified by ID 2 (e.g., a L2 ID) and the UE 215c may be identified by ID 3 (e.g., a L2 ID). As shown by the routing table 1120, a QCL source B1 (e.g., the beam 1104) is assigned to the hop-destination ID of ID 2, and a QCL source B2 (e.g., the beam 1106) is assigned to the hop-destination ID of ID 3. That is, the routing table 1120 configures the UE 215a to utilize the beam B1 1104 when forwarding sidelink data to the UE 215b, and to utilize the beam B2 1106 when forwarding sidelink data to the UE 215c. While FIG. 11 illustrates the routing table 1120 with two columns, one for hop-destination IDs and another one for QCL sources, aspects are not limited thereto. For instance, the routing table 1120 may also include a column for destination IDs similar to the routing table shown in FIG. 6 or any other suitable routing information.

The serving BS may configure the UE 215a with a CG similar to the CG 401 and including CG occasions 1110 similar to the CG occasions 410, 810, and 910. For simplicity, FIG. 11 illustrates one CG occasion 1110, but the CG occasion 1110 may be repeated over time, for example, at a periodicity 1130. The CG occasion 1110 includes a transmit resource 1114 and an associated receive window 1102 including a plurality of receive resources (not shown). The transmit resource 1114, the receive window 1102, and the receive resources may be similar to the transmit resources 414, 814, and/or 914, the receive windows 402, 802, and/or 902, and the receive resources 412, 812, and/or 912, respectively. The UE 215a may monitor the receive window 1102 for a data block (e.g., a TB) for relaying. If the UE 215a detected a valid data block for relaying, for example, based on a hop-destination ID associated with the data block matches an ID of the UE 215a and/or a destination ID associated with the data block being within a set of destination IDs for relaying by the UE 215a, the UE 215a may look up the routing table 1120 based on a destination ID attached to the data block. As an example, the routing table 1120 may indicate that the hop-destination ID for the data block is ID 2 (the first row of the table 1120). Accordingly, the UE 215a may transmit the data block in the transmit resource 1114 using the beam B1 indicated by the QCL resource indicated for the hop-destination ID of ID 2. As another example, the routing table 1120 may indicate that the hop-destination ID for the data block is ID 3 (the second row of the table 1120). Accordingly, the UE 215a may transmit the data block in the transmit resource 1114 using the beam B2 indicated by the QCL resource indicated for the hop-destination ID of ID 3.

In some aspects, the serving BS may configure the UE 215a with a transmit resource 1116 for the CG occasion 1110. For instance, if the UE 215a receives a NACK feedback for the transmission in the transmit resource 1114 from the UE 215b and/or the UE 215c, the UE 215a may retransmit the data block in the transmit resource 1116 according to a corresponding QCL source. That is, if the UE 215a transmits the data block to the UE 215b in the transmit resource 1114 using the beam B1 1104 (indicated by the first row of the table 1120) and the UE 215b indicates a failure in receiving the data block from the transmit resource 1114, the UE 215a may retransmit the data block in the retransmission resource 1116 again using the beam B1 1104 towards the UE 215b. Alternatively, if the UE 215a transmits the data block to the UE 215c in the transmit resource 1114 using the beam B2 1106 (indicated by the second row of the table 1120) and the UE 215c indicates a failure in receiving the data block from the transmit resource 1114, the UE 215a may retransmit the data block in the retransmission resource 1116 again using the beam B1 1106 towards the UE 215c.

In some aspects, the serving BS may configure the UE 215a to transmit in the transmit resource 1114 and/or the transmit resource 1116 of the CG occasion 1110 using multiple beams, for example, the beam B1 1104 and the beam B2 1106. As such, when the UE 215a detected a data block for the destination UE 215d in the receive window 1102, the UE 215a may transmit the TB in the transmit resource 1114 using the beam B1 1104 towards the UE 215b and using the beam B2 1106 towards the UE 215c at the same time. Similarly, if the UE 215a receives a NACK feedback for the transmission in the transmit resource 1114 from the UE 215b and/or the UE 215c, the UE 215a may retransmit the data block in the transmit resource 1116 using the beam B1 1104 and the beam B2 1106.

Figure 12:
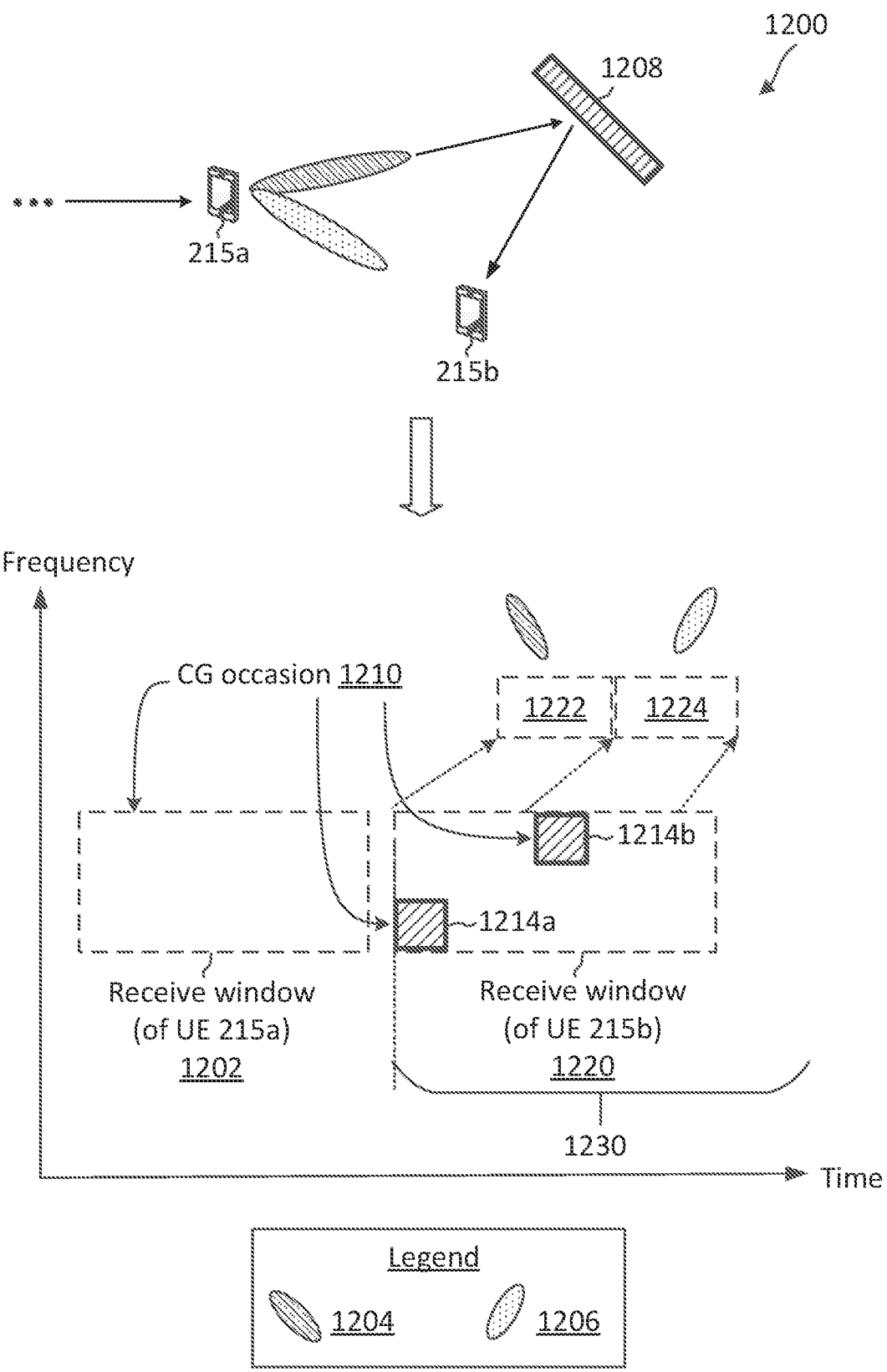
FIG. 12 illustrates a CG-based multi-hop sidelink communication scheme with transmit beamforming according to some aspects of the present disclosure.

FIG. 12 illustrates a CG-based multi-hop sidelink communication scheme 1200 with transmit beamforming according to some aspects of the present disclosure. The scheme 1200 may be employed by UEs such as the UEs 115 and 215. In particular, a UE 215 may apply transmit beamforming to transmit data to a next-hop UE along a multi-hop sidelink path as shown in the scheme 1200. The scheme 1200 can be used in conjunction with the schemes 400, 600, 700, 800, 900, 1000, and/or 1100 discussed above with reference to FIGS. 4, 6, 7, 8, 9, 10, and/or 11, respectively, and/or the sidelink mesh topology mesh discussed above with reference to FIG. 5. In FIG. 12, the x-axis represents time in some arbitrary units, and the y-axis represents frequency in some arbitrary units.

In the scheme 1200, UEs 215a and/or 215b may be configured by a serving BS (e.g., the BSs 105 and/or 205) to operate as sidelink relay UEs. The UE 215a may be configured to forward data to the next-hop UE 215b for multi-hop sidelink operations. The UE 215a may utilize transmit beamforming to form narrow, directional transmission beams for transmitting sidelink data to the UE 215b. For instance, the UE 215a may configure antenna elements (e.g., the antennas 1516) at the UE 215a to generate a number of transmission beams in a number of different beam directions (e.g., about 2, 3, 4, 5, 6, 7, 8 or more) and may utilize multiple beams to transmit to the UE 215b. In the illustrated example of FIG. 12, the UE 215a may generate a beam B1 1204 (shown by the diagonal striped beam) for transmitting to the UE 215b in a line-of-sight (LOS) path. Alternatively, the UE 215a may generate a beam B2 1206 (dot-pattern-filled beam) for transmitting to the UE 215b in a non-LOS path, for example, reflected by a reflector 1208, which may be a building or any object that reflects the beam B2 1206 towards the UE 215b.

The serving BS may configure the UE 215a with a CG similar to the CG 401 and including CG occasions 1210 similar to the CG occasions 410, 810, 910, and/or 1110. For simplicity, FIG. 12 illustrates one CG occasion 1210, but the CG occasion 1210 may be repeated over time, for example, at a periodicity 1230. The CG occasion 1210 includes multiple transmit resources 1214 (shown as 1214a and 1214b) and an associated receive window 1202 including a plurality of receive resources (not shown). The transmit resource 1214, the receive window 1202, and the receive resources may be similar to the transmit resources 414, 814, 914, and/or 1114, the receive windows 402, 802, 902, and/or 1102, and the receive resources 412, 812, 912, and/or 1112, respectively. The UE 215b may be configured with CG occasions similar to the CG occasions 410, 810, 910, 1110, and/or 1210. The transmit resources 1214 (of the UE 215a's CG occasion 1210) may be within a receive window 1220 of the UE 215b. That is, the UE 215b's receive window 1220 may correspond to a transmit window of the UE 215a (a previous-hop of the UE 215b).

In some aspects, the serving BS may configure the UE 215b to utilize receive beam sweep to monitor its receive window 1220, for example, as discussed above with reference to FIGS. 9 and/or 10. Additionally, the serving BS may configure the UE 215a to utilize transmit beam sweep for transmission to the next-hop UE 215b. For instance, the receive window of the UE 215b may be partitioned into two sub-windows 1222 and 1224 in time. Each sub window 1222 and 1224 may include one or more slots. The serving BS may configure the UE 215a to transmit using the beam B1 1204 in the sub-window 1222 and using the beam B2 1206 in the sub-window 1222. Accordingly, when the UE 215a detected a valid data block (e.g., TB) for relaying in the receive window 1202 (e.g., based on a hop-destination ID associated with the data block matches the UE 215a's ID), the UE 215a may transmit the data block in the transmit resource 1214a (e.g., in a PSSCH) using the beam B1 1204 since the transmit resource 1214a is within the sub-window 1222. The UE 215a may repeat the transmission of the data block in the transmit resource 1214b (e.g., in a PSSCH) using the beam B2 1206 since the transmit resource 1214b is within the sub-window 1224. In some aspects, the UE 215a may utilize redundancy version (RV) 0 for both data block transmissions in the transmit resources 1214a and 1214b.

Figure 13:
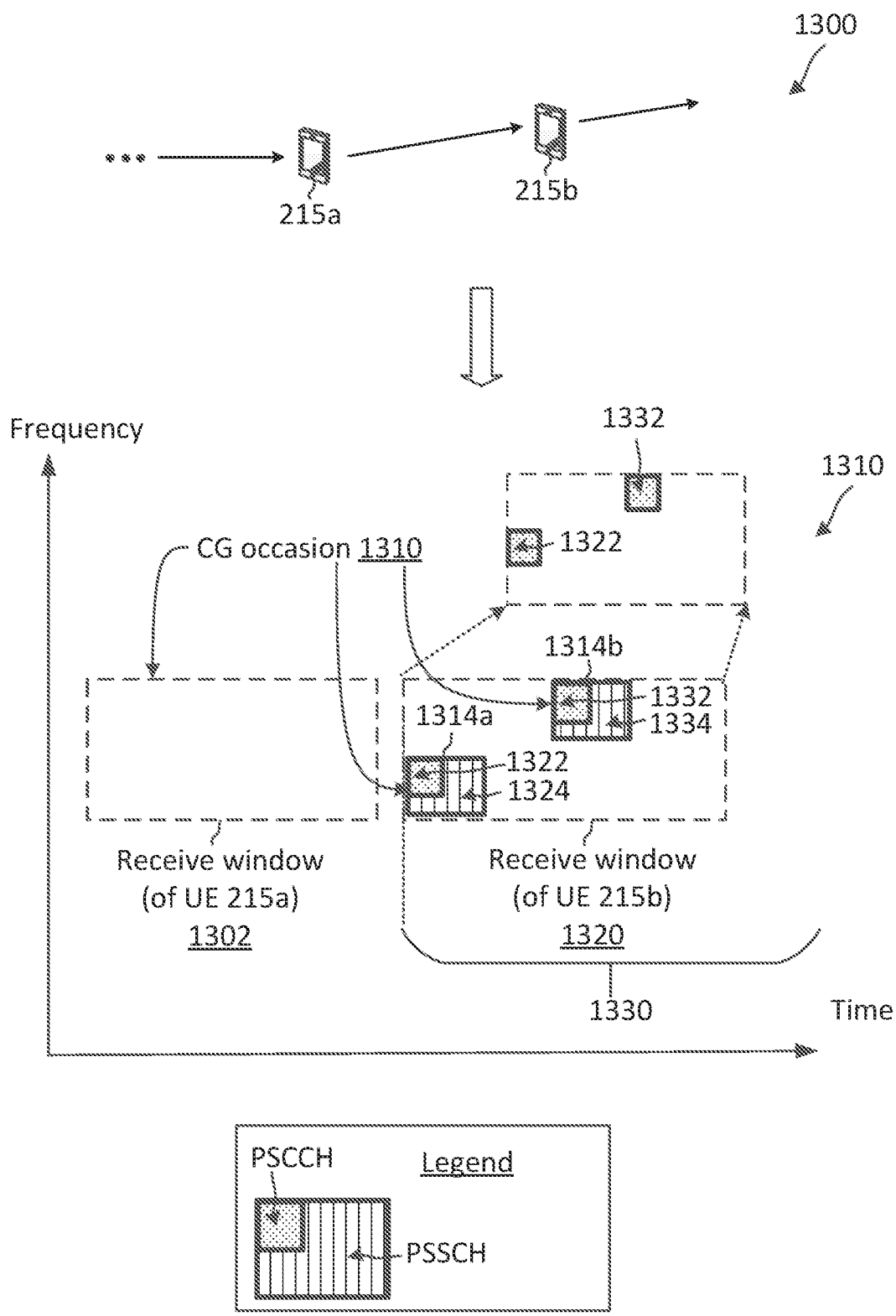
FIG. 13 illustrates a CG-based multi-hop sidelink communication scheme with sidelink control information (SCI) repetition according to some aspects of the present disclosure.

FIG. 13 illustrates a CG-based multi-hop sidelink communication scheme 1300 with SCI repetitions according to some aspects of the present disclosure. The scheme 1300 may be employed by UEs such as the UEs 115 and 215. In particular, a UE 215 may apply transmit beamforming to transmit data to a next-hop UE along a multi-hop sidelink path as shown in the scheme 1300. The scheme 1200 can be used in conjunction with the schemes 400, 600, 700, 800, 900, 1000, 1100, and/or 1200 discussed above with reference to FIGS. 4, 6, 7, 8, 9, 10, 11, and/or 12, respectively, and/or the sidelink mesh topology mesh discussed above with reference to FIG. 5. In FIG. 13, the x-axis represents time in some arbitrary units, and the y-axis represents frequency in some arbitrary units.

In the scheme 1300, a serving BS (e.g., the BSs 105 and/or 205) may configure UEs 215a and/or 215b to operate as sidelink relay UEs. The UE 215a may be configured to forward data to the next-hop UE 215b for multi-hop sidelink operations. The serving BS may configure the UE 215a with a CG similar to the CG 401 and including CG occasions 1310 similar to the CG occasions 410, 810, 910, 1110, and/or 1210. For simplicity, FIG. 13 illustrates one CG occasion 1310, but the CG occasion 1310 may be repeated over time, for example, based on a periodicity 1330. The CG occasion 1310 includes multiple transmit resources 1314 (shown as 1314a and 1314b) and an associated receive window 1302 including a plurality of receive resources (not shown). The transmit resources 1314, the receive window 1302, and the receive resources may be similar to the transmit resources 414, 814, 914, 1114, and/or 1214, the receive windows 402, 802, 902, 1102, and/or 1202, and the receive resources 412, 812, 912, 1112, and/or 1212, respectively. The UE 215b may be configured with also be configured with a CG similar to the CG 401 and including CG occasions similar to the CG occasions 410, 810, 910, 1110, 1210, and/or 1310. The transmit resources 1314 (of the UE 215a's CG occasion 1310) may be within a receive window 1320 of the UE 215b. That is, the UE 215b's receive window 1320 may correspond to a transmit window of the UE 215a (a previous-hop of the UE 215b).

In some aspects, the serving BS may configure the UE 215a to perform SCI repetition when forwarding data for multi-hop sidelink. For instance, the UE 215a may monitor the receive window 1302 and may detect in the receive window 1302 a valid data block (e.g., TB) for relaying, for example, based on a hop-destination ID associated with the data block matches the UE 215'a ID and/or a destination ID associated with the data block being within a set of destination IDs for relaying by the UE 215a. The UE 215 may transmit the data block in the transmit resource 1314a to the UE 215b, for example, based on a routing table (e.g., the routing tables 610 and/or 1120). The transmit resource 1314a may include a PSSCH portion and a PSCCH portion. The UE 215a may transmit the data block (shown by 1324) in the PSSCH portion of the transmit resource 1314a and may transmit SCI 1322 in the PSCCH portion of the transmit resource 1314a (e.g., a first transmission). The SCI 1322 may include sidelink reservation information, address information (e.g., similar to the 4-address vector discussed above with reference to FIG. 6) for the data block 1324, and/or any other suitable control information. Additionally, the UE 215a may repeat the transmission of the data block 1324 (shown as 1334) in the PSSCH portion of the transmit resource 1314b and repeat the transmission of the SCI 1322 (shown as 1332) in the PSCCH portion of the transmit resource 1314b (e.g., a second transmission). In this way, the UE 215b may monitor the receive window 1320 and may receive the data block 1324 and SCI 1322 from the first transmission in the transmit resource 1314a and the data block 1334 and SCI 1332 from the second transmission in the transmit resource 1314b.

The serving BS may configure the UE 215b to receive in the transmit resource 1314a and the transmit resource 1314b. Accordingly, the UE 215n may receive the first transmission from the transmit resource 1314a and the receive the second transmission from the transmit resource 1314b. The UE 215b may combine the SCI 1322 from the first transmission and the SCI 1332 from the second transmission to decode the SCI, for example, using chase-combining. The combining of the SCI 1332 from the first transmission and the SCI from the second transmission may allow the UE 215b to successfully decode the SCI that may otherwise fail the decoding. Further, based on the decoded SCI, the UE 215b may combine the PSSCH from the first transmission and the PSCCH from the second transmission to decode the data block, for example, using chase-combining, to improve PSSCH decoding performance.

In some instances, the serving BS may configure the UE 215a to apply the same RV (e.g., RV 0) for both the first and second transmissions of the data block in the transmit resources 1314a and 1314b. In other instances, the serving BS may configure the UE 215a to apply the different RVs for the first transmission of the data block in the transmit resource 1314a and for the second transmissions of the data block in the transmit resource 1314b. In such instances, the UE 215a may apply incremental redundancy (IR)-based encoding to generate the first and second transmissions and may indicate, in each of the SCI 1322 and 1332, the RV value for the corresponding PSSCH transmission. The UE 215b may apply the chase-combining for SCI decoding. After decoding the SCI, the UE 215b may apply IR-based decoding for the PSSCH decoding based on the decoded SCI (e.g., the RV value indicated by the SCI).

In some aspects, the serving BS may further configure the UE 215a with different QCL sources for transmitting in the transmit resource 1314a and in the transmit resource 1314b, for example, as discussed above with reference to FIG. 12. For instance, the UE 215a may transmit the first transmission including the SCI 1322 and the data block 1324 in the transmit resource 1314a and in a first beam direction and transmit the second transmission including the SCI 1332 and the data block 1334 in the transmit resource 1314b and in a second beam direction different from the first beam direction. The serving BS may configure the UE 215b with the transmit resource 1314a and the transmit resource 1314b and configure the UE 215b to monitor the transmit resource 1314a in the first beam direction and monitor the transmit resource 1314b in the second beam direction.

While FIG. 13 illustrates the transmit resource 1314a and the transmit resource 1314b occupying different sub-channels, aspects are not limited thereto. For instance, the transmit resource 1314a and the transmit resource 1314b can occupy the same sub-channel.

In some aspects, a BS (e.g., the BS 105s and/or 205) may configure an initiating sidelink UE (e.g., the UEs 115 and/or 215) to transmit sidelink data (e.g., PSSCH data) to a destination sidelink UE along a multi-hop sidelink path include one or more sidelink relay UEs between initiating sidelink UE and the destination sidelink UE. The BS may configure each of the one or more sidelink relay UEs along the multi-hop sidelink path with a CG for forwarding the sidelink data using any suitable combinations of mechanisms discussed above with reference to FIGS. 4-13. For instance, the BS may configure each of the one or more sidelink relay UEs with a CG similar to the CG 401. Further, a CG occasion may include any suitable number of transmit resources (e.g., 1, 2, 3 or more) for beam sweep and/or retransmissions and an associated receive window having any suitable number of receive resources (e.g., 1, 2, 3, 4, 5, 6, 7, or more), where the receive resource(s) and/or transmit resource(s) can be located at any suitable time and/or frequency. In some aspects, the BS may configure the initiating sidelink UE with a CG (type-1 CG or type-2 CG) or a dynamic grant (e.g., DCI format 3_0) for transmitting the sidelink data to a next-hop UE on the multi-hop sidelink path.

Figure 14:
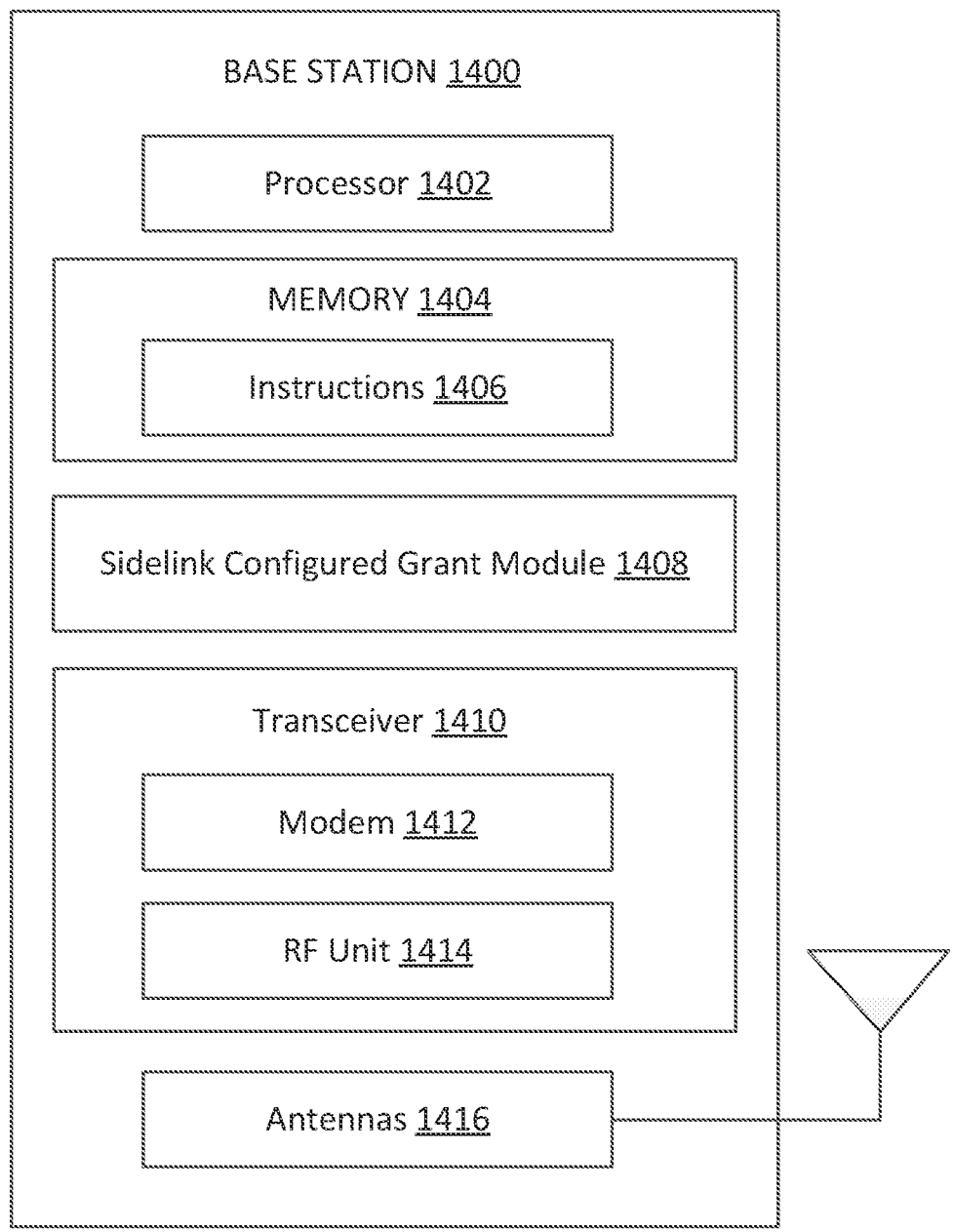
FIG. 14 illustrates a block diagram of a base station (BS) according to some aspects of the present disclosure.

FIG. 14 is a block diagram of an exemplary BS 1400 according to some aspects of the present disclosure. The BS 1400 may be a BS 105 or a BS 205 as discussed in FIGS. 1-13. As shown, the BS 1400 may include a processor 1402, a memory 1404, a sidelink configured grant module 1408, a transceiver 1410 including a modem subsystem 1412 and a RF unit 1414, and one or more antennas 1416. These elements may be coupled with one another. The term "coupled" may refer to directly or indirectly coupled or connected to one or more intervening elements. For instance, these elements may be in direct or indirect communication with each other, for example via one or more buses.

The processor 1402 may have various features as a specific-type processor. For example, these may include a CPU, a DSP, an ASIC, a controller, a FPGA device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1404 may include a non-transitory computer-readable medium. The memory 1404 may store instructions 1406. The instructions 1406 may include instructions that, when executed by the processor 1402, cause the processor 1402 to perform operations described herein, for example, aspects of FIGS. 1-13 and 17. Instructions 1406 may also be referred to as program code. The program code may be for causing a wireless communication device to perform these operations, for example by causing one or more processors (such as processor 1402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink configured grant module 1408 may be implemented via hardware, software, or combinations thereof. For example, the sidelink configured grant module 1408 may be implemented as a processor, circuit, and/or instructions 1406 stored in the memory 1404 and executed by the processor 1402. In some examples, the sidelink configured grant module 1408 can be integrated within the modem subsystem 1412. For example, the sidelink configured grant module 1408 can be implemented by a combination of software components (e.g., executed by a DSP or a general processor) and hardware components (e.g., logic gates and circuitry) within the modem subsystem 1412. The sidelink configured grant module 1408 may communicate with one or more components of BS 1400 to implement various aspects of the present disclosure, for example, aspects of FIGS. 1-13 and 17.

In some aspects, the sidelink configured grant module 1408 is configured to transmit, to a first UE (e.g., the UEs 115 and/or 215), a first CG indicating a first CG occasion, where the first CG occasion includes a first transmit resource and a first receive window. The first CG may be similar to the CG 401 as discussed above with reference to FIG. 4. The first CG occasion may be similar to the CG occasions 410, 810, 910, 1110, 1210, and/or 1310. The first transmit resource may occupy one more symbols (e.g., a sidelink slot) in time and one or more subcarriers (e.g., a sidelink subchannel) in frequency. The first receive window may include a plurality of receive resources. Each receive resource may be similar to the first transmit resource, for example, occupying one more symbols in time and one or more subcarriers in frequency.

The sidelink configured grant module 1408 is further configured to transmit, to a second UE (e.g., the UEs 115 and/or 215), a second CG indicating a second CG occasion, where the second CG occasion includes a second transmit resource and a second receive window. The second CG may be similar to the CG 401 as discussed above with reference to FIG. 4. The second CG occasion may be similar to the CG occasions 410, 810, 910, 1110, 1210, and/or 1310. The second transmit resource may occupy one more symbols (e.g., a sidelink slot) in time and one or more subcarriers (e.g., a sidelink subchannel) in frequency. The second receive window may include a plurality of receive resources. Each receive resource may be similar to the second transmit resource, for example, occupying one more symbols in time and one or more subcarriers in frequency. The second UE may also be associated with the sidelink multi-hop path.

In some aspects, the sidelink configured grant module 1408 may be further configured to configure the first UE and/or the second UE with a routing table for relaying data along the sidelink multi-hop path as discussed above with reference to FIG. 6. In some aspects, the sidelink configured grant module 1408 may be further configured to receive a skip indication from the first UE and reschedule a transmit resource (of the first UE) for the second UE as discussed above with reference to FIG. 7. In some aspects, the sidelink configured grant module 1408 may be further configured to configure the first UE to perform receive beamforming and/or beam sweep for receptions in the first CG occasion (e.g., first receive window) and/or configure the second UE to perform receive beamforming and/or beam sweep for receptions in the second CG occasion (e.g., second receive window) as discussed above with reference to FIGS. 8, 9, and/or 10. In some aspects, the sidelink configured grant module 1408 may be further configured to configure the first UE to perform transmit beamforming and/or beam sweep for transmission(s) in the first CG occasion and/or configure the second UE to perform transmit beamforming and/or beam sweep for transmission(s) in the second CG occasion as discussed above with reference to FIGS. 11 and 12. In some aspects, the sidelink configured grant module 1408 may be further configured to configure the first UE to perform transmission(s) with SCI repetitions and/or perform decoding with combining (e.g., chase-combining and/or IR decoding) in the first CG occasion and/or configure the second UE to perform transmission(s) with SCI repetitions and/or perform decoding with combining (e.g., chase-combining and/or IR decoding) in the second CG occasion as discussed above with reference to FIG. 13.

As shown, the transceiver 1410 may include the modem subsystem 1412 and the RF unit 1414. The transceiver 1410 can be configured to communicate bi-directionally with other devices, such as the UEs 115 and/or BS 1400 and/or another core network element. The modem subsystem 1412 may be configured to modulate and/or encode data according to a MCS, e.g., a LDPC coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., RRC configurations, CGs, CG activations, PDSCH data, PDCCH DCIs, etc.) from the modem subsystem 1412 (on outbound transmissions) or of transmissions originating from another source such as a UE 115, 215, and/or UE 1500. The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together at the BS 1400 to enable the BS 1400 to communicate with other devices.

The RF unit 1414 may provide the modulated and/or processed data, e.g. data packets (or, more generally, data messages that may contain one or more data packets and other information), to the antennas 1416 for transmission to one or more other devices. The antennas 1416 may further receive data messages transmitted from other devices and provide the received data messages for processing and/or demodulation at the transceiver 1410. The transceiver 1410 may provide the demodulated and decoded data (e.g., SRs, BSRs, HARQ ACK/NACKs, PUSCH data and/or PUSCH UCIs, etc.) to the sidelink configured grant module 1408 for processing. The antennas 1416 may include multiple antennas of similar or different designs in order to sustain multiple transmission links.

In an aspect, the BS 1400 can include multiple transceivers 1410 implementing different RATs (e.g., NR and LTE). In an aspect, the BS 1400 can include a single transceiver 1410 implementing multiple RATs (e.g., NR and LTE). In an aspect, the transceiver 1410 can include various components, where different combinations of components can implement different RATs.

Further, in some aspects, the processor 1402 is coupled to the memory 1404 and the transceiver 1410. The processor 1402 is configured to transmit, to a first UE via the transceiver 1410, a first CG indicating a first CG occasion, where the first CG occasion includes a first transmit resource and a first receive window. The processor 1402 is further configured to transmit, to a second UE via the transceiver 1410, a second CG indicating a second CG occasion, where the second CG occasion includes a second transmit resource and a second receive window.

Figure 15:
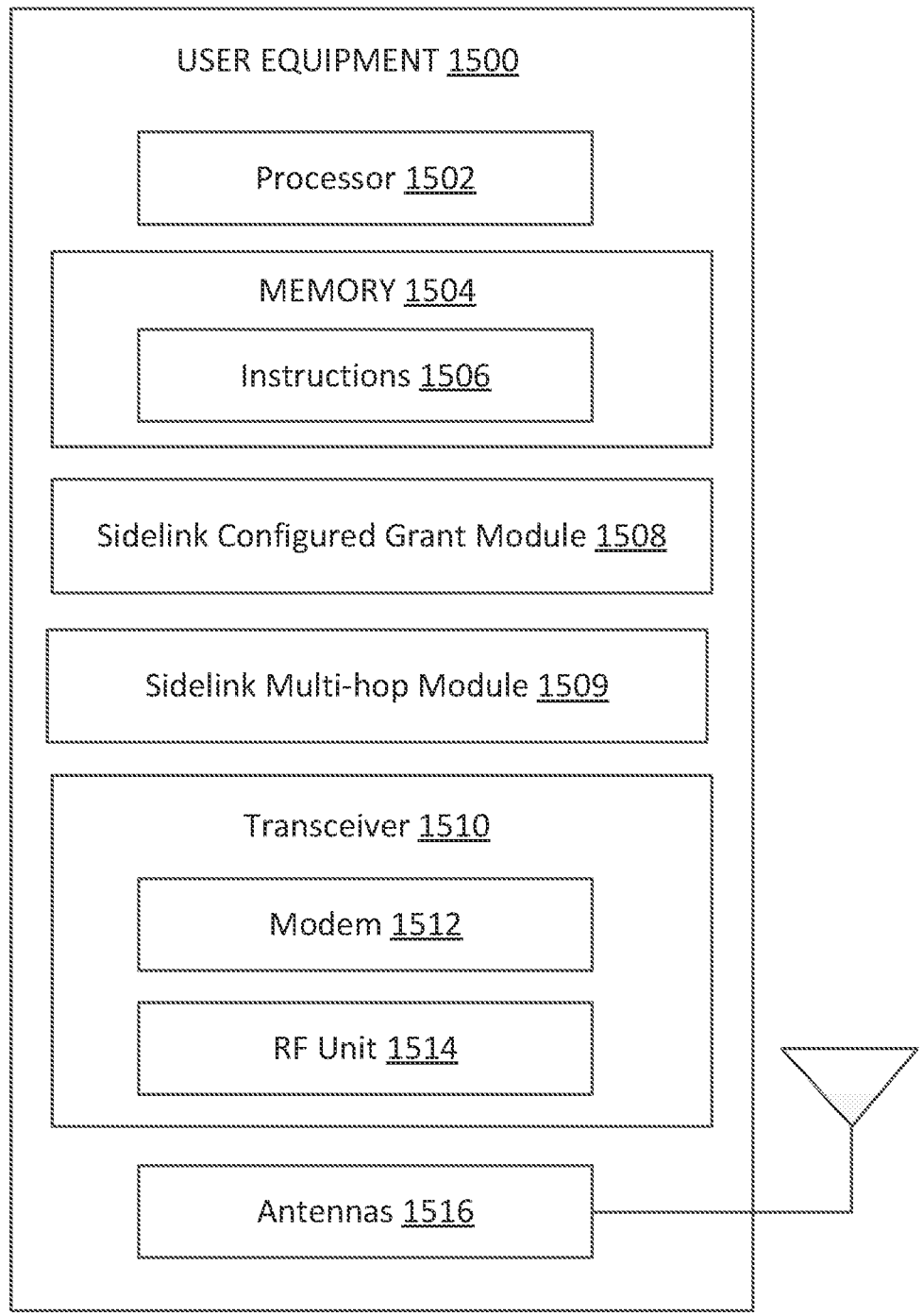
FIG. 15 illustrates a block diagram of a user equipment (UE) according to some aspects of the present disclosure.

FIG. 15 is a block diagram of an exemplary UE 1500 according to some aspects of the present disclosure. The UE 1500 may be a UE 115 or a UE 215 as discussed above in FIGS. 1-13 and 16. As shown, the UE 1500 may include a processor 1502, a memory 1504, a sidelink configured grant module 1508, a sidelink multi-hop module 1509, a transceiver 1510 including a modem subsystem 1512 and a radio frequency (RF) unit 1514, and one or more antennas 1516. These elements may be coupled with one another. The term "coupled" may refer to directly or indirectly coupled or connected to one or more intervening elements. For instance, these elements may be in direct or indirect communication with each other, for example via one or more buses.

The processor 1502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1502 may also be implemented as a combination of computing devices, e.g., a combination of a DSP and a microprocessor, a plurality of microprocessors, one or more microprocessors in conjunction with a DSP core, or any other such configuration.

The memory 1504 may include a cache memory (e.g., a cache memory of the processor 1502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1504 includes a non-transitory computer-readable medium. The memory 1504 may store, or have recorded thereon, instructions 1506. The instructions 1506 may include instructions that, when executed by the processor 1502, cause the processor 1502 to perform the operations described herein with reference to a UE 115 or an anchor in connection with aspects of the present disclosure, for example, aspects of FIGS. 1-13 and 16. Instructions 1506 may also be referred to as code, which may be interpreted broadly to include any type of computer-readable statement(s) as discussed above with respect to FIG. 14.

Each of the sidelink configured grant module 1508 and the sidelink multi-hop module 1509 may be implemented via hardware, software, or combinations thereof. For example, each of the sidelink configured grant module 1508 and the sidelink multi-hop module 1509 may be implemented as a processor, circuit, and/or instructions 1506 stored in the memory 1504 and executed by the processor 1502. In some aspects, the sidelink configured grant module 1508 and/or the sidelink multi-hop module 1509 can be integrated within the modem subsystem 1512. For example, the sidelink configured grant module 1508 and/or the sidelink multi-hop module 1509 can be implemented by a combination of software components (e.g., executed by a DSP or a general processor) and hardware components (e.g., logic gates and circuitry) within the modem subsystem 1512. Each of the sidelink configured grant module 1508 and the sidelink multi-hop module 1509 may communicate with one or more components of UE 1500 to implement various aspects of the present disclosure, for example, aspects of FIGS. 1-13 and 16.

In some aspects, the sidelink configured grant module 1508 is configured to receive, from a BS (e.g., the BSs 105, 205, and/or 1400), a CG indicating a first CG occasion. The first CG occasion includes a first transmit resource and a first receive window. The CG may be similar to the CG 401 discussed above with reference to FIG. 4. For instance, the first CG occasion may be similar to the CG occasions 410, 810, 910, 1110, 1210, and/or 1310. The first transmit resource may occupy one more symbols (e.g., a sidelink slot) in time and one or more subcarriers (e.g., a sidelink subchannel) in frequency. The first receive window may include a plurality of receive resources. Each receive resource may be similar to the first transmit resource, for example, occupying one more symbols in time and one or more subcarriers in frequency. The UE sidelink configured grant module 1508 may be further configured to provide information related to the first CG occasion to the sidelink multi-hop module 1509 for multi-hop sidelink operations.

In some aspects, the sidelink multi-hop module 1509 is configured to receive, from a second UE in the first receive window, a first communication signal including a first data block (e.g., a TB). For instance, the second UE may be a previous-hop of the UE 1500 along a multi-hop sidelink path. The sidelink multi-hop module 1509 is further configured to transmit, to a third UE in the first transmit resource, a second communication signal including the first data block. For instance, the third UE may be a next-hop of the first UE along the multi-hop sidelink path. In some aspects, the sidelink multi-hop module 1509 may be further configured to determine that the first data block is valid for relaying and transmit the second communication signal including the first data block to the third UE based on a routing configuration as discussed above with reference to FIG. 6.

In some aspects, the sidelink multi-hop module 1509 may be further configured to transmit a skip indication to the BS when failing to detect any valid data block for relaying in a receive window associated with the CG as discussed above with reference to FIG. 7. In some aspects, the sidelink multi-hop module 1509 may be further configured to configure to perform receive beamforming and/or beam sweep for receptions in the first CG occasion (e.g., first receive window) as discussed above with reference to FIGS. 8, 9, and/or 10. In some aspects, the sidelink multi-hop module 1509 may be further configured to configure to perform transmit beamforming and/or beam sweep for transmission(s) in the first CG occasion as discussed above with reference to FIGS. 11 and 12. In some aspects, the sidelink multi-hop module 1509 may be further configured to configure to perform transmission(s) with SCI repetitions and/or perform decoding with combining (e.g., chase-combining and/or IR decoding) in the first CG occasion as discussed above with reference to FIG. 13.

As shown, the transceiver 1510 may include the modem subsystem 1512 and the RF unit 1514. The transceiver 1510 can be configured to communicate bi-directionally with other devices, such as the BSs 105 and 1400. The modem subsystem 1512 may be configured to modulate and/or encode the data from the memory 1504, the sidelink configured grant module 1508, and/or the sidelink multi-hop module 1509 according to a modulation and coding scheme (MCS), e.g., a low-density parity check (LDPC) coding scheme, a turbo coding scheme, a convolutional coding scheme, a digital beamforming scheme, etc. The RF unit 1514 may be configured to process (e.g., perform analog to digital conversion or digital to analog conversion, etc.) modulated/encoded data (e.g., SRs, BSRs, HARQ ACK/NACKs, PUSCH data and/or PUSCH UCIs, etc.) or of transmissions originating from another source such as a UE 115, a BS 105, or an anchor. The RF unit 1514 may be further configured to perform analog beamforming in conjunction with the digital beamforming. Although shown as integrated together in transceiver 1510, the modem subsystem 1512 and the RF unit 1514 may be separate devices that are coupled together at the UE 1500 to enable the UE 1500 to communicate with other devices.

The RF unit 1514 may provide the modulated and/or processed data, e.g. data packets (or, more generally, data messages that may contain one or more data packets and other information), to the antennas 1516 for transmission to one or more other devices. The antennas 1516 may further receive data messages transmitted from other devices. The antennas 1516 may provide the received data messages for processing and/or demodulation at the transceiver 1510. The transceiver 1510 may provide the demodulated and decoded data (e.g., RRC configurations, CGs, CG activations, PDSCH data, PDCCH DCIs, etc, etc.) to the sidelink configured grant module 1508 and/or the sidelink multi-hop module 1509 for processing. The antennas 1516 may include multiple antennas of similar or different designs in order to sustain multiple transmission links.

In an aspect, the UE 1500 can include multiple transceivers 1510 implementing different RATs (e.g., NR and LTE). In an aspect, the UE 1500 can include a single transceiver 1510 implementing multiple RATs (e.g., NR and LTE). In an aspect, the transceiver 1510 can include various components, where different combinations of components can implement different RATs.

Further, in some aspects, the processor 1502 is coupled to the memory 1504 and the transceiver 1510. The processor 1502 is configured to receive, from a BS via the transceiver 1510, a CG indicating a first CG occasion, where the first CG occasion includes a first transmit resource and a first receive window. The processor 1502 is configured to receive, from a second UE via the transceiver 1510 in the first receive window, a first communication signal including a first data block (e.g., a TB). The processor 1502 is configured to transmit, to a third UE via the transceiver 1510 in the first transmit resource, a second communication signal including the first data block.

Figure 16:
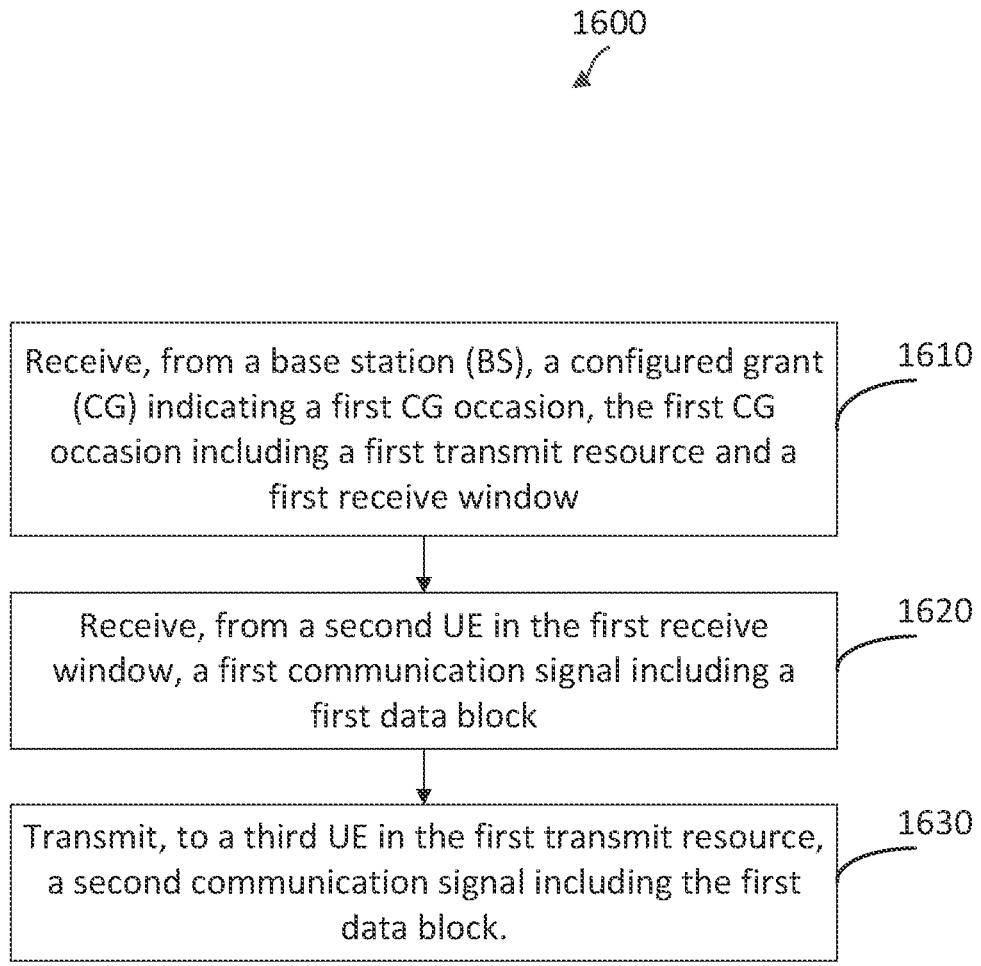
FIG. 16 is a flow diagram of a wireless communication method according to some aspects of the present disclosure.

FIG. 16 is a flow diagram illustrating a wireless communication method 1600 according to some aspects of the present disclosure. Aspects of the method 1600 can be executed by a computing device (e.g., a processor, processing circuit, and/or other suitable component) of a wireless communication device or other suitable means for performing the blocks. In one aspect, a wireless communication device, such as a UE 115, 215, or 1500, may utilize one or more components, such as the processor 1502, the memory 1504, the sidelink configured grant module 1508, the sidelink multi-hop module 1509, the transceiver 1510, the modem 1512, the RF unit 1514, and the one or more antennas 1516, to execute the blocks of method 1600. The method 1600 may employ similar mechanisms as described in FIGS. 1-13. As illustrated, the method 1600 includes a number of enumerated blocks, but aspects of the method 1600 may include additional blocks before, after, and in between the enumerated blocks. In some aspects, one or more of the enumerated blocks may be omitted or performed in a different order.

At block 1610, a first UE receives, from a BS, a CG indicating a first CG occasion. The first CG occasion includes a first transmit resource and a first receive window. In some aspects, the first UE may correspond to a UE 115, a UE 215, or a UE 1500 and may operate as a sidelink relay UE as discussed above with reference to FIGS. 1-13. The BS may correspond to a BS 105, a BS 205, or a BS 1400. The CG may be similar be similar to the CG 401 discussed above with reference to FIG. 4. The first CG occasion may be similar to the CG occasions 410, 810, 910, 1110, 1210, and/or 1310. The first transmit resource may occupy one more symbols (e.g., a sidelink slot) in time and one or more subcarriers (e.g., a sidelink subchannel) in frequency. The first receive window may include a plurality of receive resources. Each receive resource may be similar to the first transmit resource, for example, occupying one more symbols in time and one or more subcarriers in frequency. The first UE may use the first CG occasion for multi-hop sidelink operations. In some aspects, means for performing the functionality of block 1610 can, but not necessarily, include, for example, sidelink configured grant module 1508, sidelink multi-hop module 1509, transceiver 1510, antennas 1516, processor 1502, and/or memory 1504 with reference to FIG. 15.

At block 1620, the first UE receives, from a second UE in the first receive window, a first communication signal including a first data block (e.g., a TB). For instance, the second UE may be a previous-hop of the first UE along a multi-hop sidelink path. In some aspects, as part of receiving the first communication signal, the first UE may receive the first data block in a first receive resource of the plurality of receive resources. In some aspects, the first communication signal may include address information associated with the first data block. The address information may include a first source ID, a first hop-source ID, a first hop-destination ID, and a first destination ID. In some aspects, the first communication signal may include SCI including at least a portion of each of the first source ID, the first hop-source ID, the first hop-destination ID, and the first destination ID. The first communication signal may further include a MAC header associated with the first data block and including a full version of each of the first source ID, the first hop-source ID, the first hop-destination ID, and the first destination ID. In some aspects, the first UE may monitor the first receive window for a valid data block for relaying. For instance, the first UE may receive a signal from the channel during the receive window, perform blind SCI decoding on the received signal, and determine whether the received signal includes a valid data block for relaying, for example, by comparing the first hop-destination ID to an ID of the first UE. When there is match between the first hop-destination ID and the ID of the first UE, the first data block in the first communication signal is valid for relaying by the first UE. After successfully, decoding the SCI, the first UE may decode the first data block from the first communication signal. If the decoding of the first data block is successful (e.g., with a CRC pass), the first UE may determine to forward the first data block. In some aspects, the first UE may further determine that the first data block is for relaying by the first UE based on the first destination ID associated with the first data block is within a set of one or more destination IDs for relaying by the first UE. For instance, the first UE may be configured by the BS to operate as a sidelink relay UE for sidelink UE(s) associated with the set of one or more destination IDs. In some aspects, means for performing the functionality of block 1620 can, but not necessarily, include, for example, sidelink configured grant module 1508, sidelink multi-hop module 1509, transceiver 1510, antennas 1516, processor 1502, and/or memory 1504 with reference to FIG. 15.

At block 1630, the first UE transmits, to a third UE in the first transmit resource, a second communication signal including the first data block. For instance, the third UE may be a next-hop of the first UE along the multi-hop sidelink path. In some aspects, means for performing the functionality of block 1630 can, but not necessarily, include, for example, sidelink configured grant module 1508, sidelink multi-hop module 1509, transceiver 1510, antennas 1516, processor 1502, and/or memory 1504 with reference to FIG. 15.

In some aspects, as part of transmitting the second communication signal at block 1630, the first UE may transmit the second communication signal to the third UE based on a routing configuration (e.g., the routing tables 610 and/or 1120) including a second destination ID corresponding to the first destination ID of the first data block, and a hop-destination ID associated with the second destination ID and identifying the third UE.

In some aspect, as part of transmitting the second communication signal at block 1630, the first UE may transmit, to the third UE in a first beam direction, the second communication signal. For instance, the first UE may configure antenna elements (e.g., the antennas 1516) at the first UE to generate a first transmission beam in the first beam direction and utilize the first transmission beam to transmit the second communication signal. In some aspects, the first UE may further transmit, to a fourth UE in a second beam direction different than the first beam direction and in the first transmit resource, a third communication signal including the first data block. For instance, the first UE may configure the antenna elements the first UE to generate a second transmission beam in the second beam direction and utilize the second transmission beam to transmit the third communication signal. In some aspects, as part of transmitting the second communication signal to the third UE in the first beam direction is based on a routing configuration including a first hop-destination ID identifying the third UE, and a first quasi-co-location (QCL) source associated with the first hop-destination ID and identifying the first beam direction. Further, as part of transmitting the third communication signal to the fourth UE in the second beam direction, the first UE may transmit the third communication signal to the fourth UE in the second beam direction based on the routing configuration further including a second hop-destination ID identifying the fourth UE, and a second QCL source associated with the second hop-destination ID and identifying the second beam direction. In some aspects, the first UE may receive the routing configuration from the BS.

In some aspects, as part of transmitting the second communication signal to the third UE at block 1630, the first UE may transmit the second communication to the third UE in a first beam direction. Further, the first UE may transmit, to the third UE, in a second beam direction different than the first beam direction and in a second transmit resource different from the first transmit resource, a third communication signal including a retransmission of the first data block. In some aspects, as part of transmitting the second communication signal at block 1630, the first UE may transmit the first data block based on a first redundancy version, and as part of transmitting the third communication signal, the first UE m ay transmit the first data block based on the same first redundancy version. For instance, the first UE may encode the first data block including information bits to generate redundancy bits and may extract a version of the information bits and redundancy bits based on a redundancy version 0 for transmission.

In some aspects, the first UE may further receive, from a fourth UE within the first receive window, a third communication signal including a second data block for relaying. The first UE may determine to transmit the second communication signal including the first data block based on at least one of a priority of the first data block or a priority of the second data block. For instance, the first UE may determine to forward the first data block using the first transmit resource based on the first data block have a higher priority (e.g., a higher traffic priority) than the second data block.

In some aspects, the CG received at block 1610 may further indicate a periodicity associated with the first CG occasion. In some aspects, the first UE may further monitor, in a second receive window of a second CG occasion based on the periodicity, for a valid data block for relaying. If the first fails to detect a valid data block for relaying the second window, the first UE may transmit, to the BS, an indication of a failure to detect a data block for relaying in the second receive window.

In some aspects, the first UE may monitor the first receive window in a plurality of beam directions for a data block for relaying, and the receiving the first communication signal including the first data block at block 1610 is from the monitoring. For instance, the first UE may configure antenna elements (e.g., the antennas 1516) at the first UE to generate a first reception beam in a first beam direction of a plurality of beam directions, receive a signal from the first beam direction, perform SCI decoding and/or data decoding on the received signal to determine whether there is data for relaying, and repeat the beam generation, the signal reception, and SCI and/or data decoding for a second reception beam in a second beam direction of the plurality of beam directions different from the first beam direction.

Figure 17:
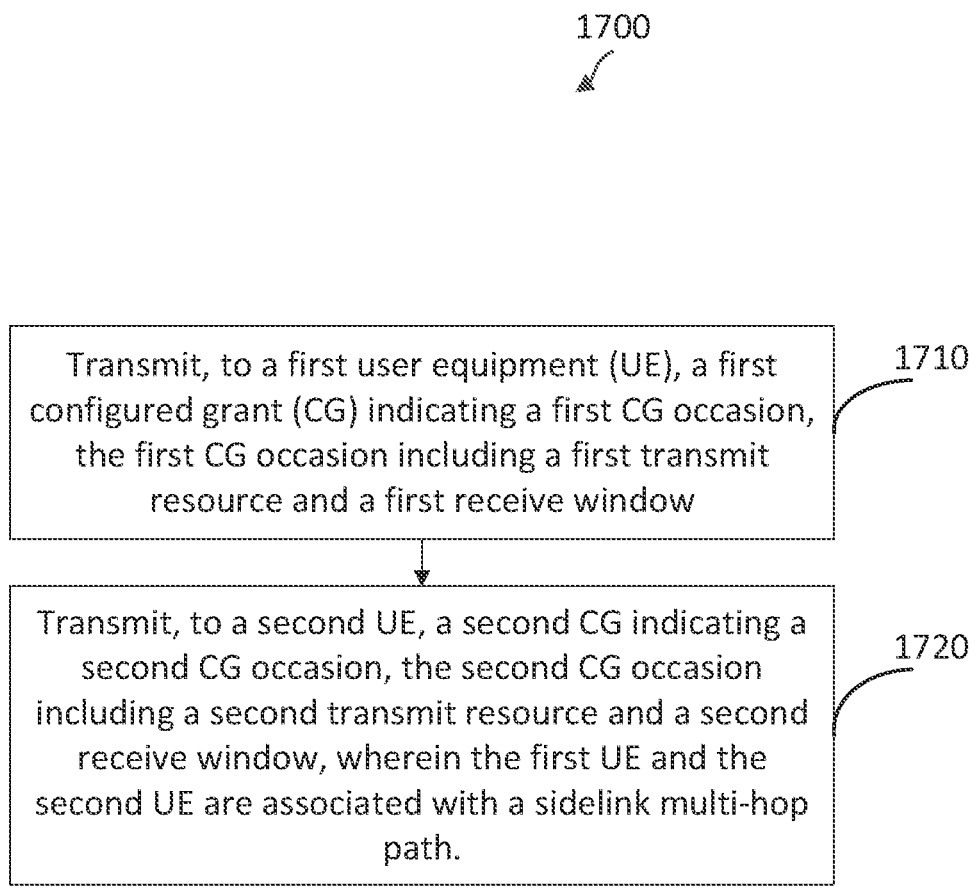
FIG. 17 is a flow diagram of a wireless communication method according to some aspects of the present disclosure.

FIG. 17 is a flow diagram illustrating a wireless communication method 1700 according to some aspects of the present disclosure. Aspects of the method 1700 can be executed by a computing device (e.g., a processor, processing circuit, and/or other suitable component) of a wireless communication device or other suitable means for performing the blocks. In one aspect, a wireless communication device, such as a BS 105, 205, or 1400, may utilize one or more components, such as the processor 1402, the memory 1404, the sidelink configured grant module 1408, the transceiver 1410, the modem 1412, the RF unit 1414, and the one or more antennas 1416, to execute the blocks of method 1700. The method 1700 may employ similar mechanisms as described in FIGS. 1-13. As illustrated, the method 1700 includes a number of enumerated blocks, but aspects of the method 1700 may include additional blocks before, after, and in between the enumerated blocks. In some aspects, one or more of the enumerated blocks may be omitted or performed in a different order.

At block 1710, a BS transmits, to a first UE, a first CG indicating a first CG occasion, where the first CG occasion includes a first transmit resource and a first receive window. In some aspects, the BS may correspond to a BS 105, a BS 205, or a BS 1400. The first UE may correspond to a UE 115, a UE 215, or a UE 1500 and may be associated with a sidelink multi-hop path. The first CG may be similar to the CG 401 as discussed above with reference to FIG. 4. For instance, the first CG occasion may be similar to the CG occasions 410, 810, 910, 1110, 1210, and/or 1310. The first transmit resource may occupy one more symbols (e.g., a sidelink slot) in time and one or more subcarriers (e.g., a sidelink subchannel) in frequency. The first receive window may include a plurality of receive resources. Each receive resource may be similar to the first transmit resource, for example, occupying one more symbols in time and one or more subcarriers in frequency. In some aspects, means for performing the functionality of block 1710 can, but not necessarily, include, for example, sidelink configured grant module 1408, transceiver 1410, antennas 1416, processor 1402, and/or memory 1404 with reference to FIG. 14.

At block 1720, the BS transmits, to a second UE, a second CG indicating a second CG occasion, where the second CG occasion includes a second transmit resource and a second receive window. The second CG may be similar to the CG 401 as discussed above with reference to FIG. 4. For instance, the second CG occasion may be similar to the CG occasions 410, 810, 910, 1110, 1210, and/or 1310. The second transmit resource may occupy one more symbols (e.g., a sidelink slot) in time and one or more subcarriers (e.g., a sidelink subchannel) in frequency. The second receive window may include a plurality of receive resources. Each receive resource may be similar to the second transmit resource, for example, occupying one more symbols in time and one or more subcarriers in frequency. The second UE may also be associated with the sidelink multi-hop path. In some aspects, means for performing the functionality of block 1720 can, but not necessarily, include, for example, sidelink configured grant module 1408, transceiver 1410, antennas 1416, processor 1402, and/or memory 1404 with reference to FIG. 14.

In some aspects, the second UE may be a next-hop of the first UE along the sidelink multi-hop path, and the BS may further transmit, to the first UE, a routing configuration including a hop-destination ID identifying the second UE and one or more QCL sources associated with the hop-destination ID.

Further aspects of the present disclosure include the following:

Aspect 1 includes a method of wireless communication performed by a first user equipment (UE), the method including receiving, from a base station (BS), a configured grant (CG) indicating a first CG occasion, the first CG occasion including a first transmit resource and a first receive window; receiving, from a second UE in the first receive window, a first communication signal including a first data block; and transmitting, to a third UE in the first transmit resource, a second communication signal including the first data block.

Aspect 2 includes the method of aspect 1, where the first receive window includes a plurality of receive resources, and where the receiving the first communication signal includes receiving, in a first receive resource of the plurality of receive resources, the first communication signal.

Aspect 3 includes the method of any of aspects 1-2, where the first communication signal includes a hop-destination ID associated with the first data block, and where the transmitting the second communication signal is based on a match between the hop-destination ID and an ID of the first UE.

Aspect 4 includes the method of any of aspects 1-3, where the first communication signal includes a destination ID associated with the first data block, and where the transmitting the second communication signal is based on the destination ID being within a set of one or more destination IDs for relaying.

Aspect 5 includes the method of any of aspects 1-4, where the first communication signal includes a first destination ID associated with the first data block, and where the transmitting the second communication signal to the third UE is based on a routing configuration including a second destination ID corresponding to the first destination ID of the first data block; and a hop-destination ID associated with the second destination ID and identifying the third UE.

Aspect 6. The method of any of aspects 1-5, where the receiving the first communication signal includes receiving the first communication signal further including a source identifier (ID), a hop-source ID, a hop-destination ID, and a destination ID associated with the first data block.

Aspect 7 includes the method of any of aspects 1-6, where the transmitting the second communication signal includes transmitting, to the third UE in a first beam direction, the second communication signal.

Aspect 8 includes the method of any of aspects 1-7, further including transmitting, to a fourth UE in a second beam direction different than the first beam direction and in the first transmit resource, a third communication signal including the first data block.

Aspect 9 includes the method of any of aspects 1-8, where the transmitting the second communication signal to the third UE in the first beam direction is based on a routing configuration including a first hop-destination ID identifying the third UE; and a first quasi-co-location (QCL) source associated with the first hop-destination ID and identifying the first beam direction; and the transmitting the third communication signal to the fourth UE in the second beam direction is based on the routing configuration further including a second hop-destination ID identifying the fourth UE; and a second QCL source associated with the second hop-destination ID and identifying the second beam direction.

Aspect 10 includes the method of any of aspects 1-9, further including receiving, from the BS, the routing configuration.

Aspect 11 includes the method of any of aspects 1-7, further including transmitting, to the third UE in a second beam direction different than the first beam direction and in a second transmit resource different from the first transmit resource, a third communication signal including the first data block.

Aspect 12 includes the method of any of aspects 1-11, where the transmitting the second communication signal includes transmitting the first data block based on a first redundancy version; and the transmitting the third communication signal includes transmitting the first data block based on the first redundancy version.

Aspect 13 includes the method of any of aspects 1-12, further including receiving, from a fourth UE within the first receive window, a third communication signal including a second data block for relaying, where the transmitting the second communication signal including the first data block is further based on at least one of a priority of the first data block or a priority of the second data block.

Aspect 14 includes the method of any of aspects 1-13, where the CG further indicates a periodicity, and where the method further includes transmitting, to the BS, an indication of a failure to detect a data block for relaying in a second receive window of a second CG occasion, where the second CG occasion is based on the periodicity.

Aspect 15 includes the method of any of aspects 1-14, further including monitoring the first receive window in a plurality of beam directions for a data block for relaying, where the receiving the first communication signal including the first data block is based on the monitoring.

Aspect 16 includes a method of wireless communication performed by a base station (BS), the method including transmitting, to a first user equipment (UE), a first configured grant (CG) indicating a first CG occasion, the first CG occasion including a first transmit resource and a first receive window; and transmitting, to a second UE, a second CG indicating a second CG occasion, the second CG occasion including a second transmit resource and a second receive window, where the first UE and the second UE are associated with a sidelink multi-hop path.

Aspect 17 includes the method of aspect 16, further including transmitting, to the first UE, a routing configuration including a hop-destination identifier (ID) identifying the second UE and one or more quasi-co-location (QCL) sources associated with the hop-destination ID.

Aspect 18 includes an apparatus comprising a processor coupled to a memory and a transceiver, wherein the processor and transceiver are configured to perform the method of any one of aspects 1-15.

Aspect 19 includes an apparatus comprising a processor coupled to a memory and a transceiver, wherein the processor and transceiver are configured to perform the method of any one of aspects 16-17.

Aspect 20 includes an apparatus comprising means for performing the method of any one of aspects 1-15.

Aspect 21 includes an apparatus comprising means for performing the method of any one of aspects 16-17.

Aspect 22 includes a non-transitory computer readable medium including program code, which when executed by one or more processors, causes a wireless communication device to perform the method of any one of aspects 1-15.

Aspect 23 includes a non-transitory computer readable medium including program code, which when executed by one or more processors, causes a wireless communication device to perform the method of any one of aspects 16-17.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
    receiving, from a base station (BS), a configured grant (CG) indicating a first CG occasion and a routing configuration indicating a first quasi-co-location (QCL) source associated with a first hop-destination identifier (ID), the first CG occasion including a first transmit resource and a first receive window;
    receiving, from a second UE in the first receive window, a first communication signal including a first data block; and
    transmitting, to a third UE in the first transmit resource, a second communication signal including the first data block.

2. The method of claim 1, wherein the first receive window includes a plurality of receive resources, and wherein the receiving the first communication signal comprises:
    receiving, in a first receive resource of the plurality of receive resources, the first communication signal.

3. The method of claim 1, wherein the first communication signal comprises a hop-destination ID associated with the first data block, and wherein the transmitting the second communication signal is based on a match between the hop-destination ID and an ID of the first UE.

4. The method of claim 1, wherein the first communication signal comprises a destination ID associated with the first data block, and wherein the transmitting the second communication signal is based on the destination ID being within a set of one or more destination IDs for relaying.

5. The method of claim 1, wherein the first communication signal comprises a first destination ID associated with the first data block, and wherein the transmitting the second communication signal to the third UE is based on a routing configuration including:
    a second destination ID corresponding to the first destination ID of the first data block; and
    a hop-destination ID associated with the second destination ID and identifying the third UE.

6. The method of claim 1, wherein the receiving the first communication signal comprises:
    receiving the first communication signal further including a source identifier (ID), a hop-source ID, a hop-destination ID, and a destination ID associated with the first data block.

7. The method of claim 1, wherein the transmitting the second communication signal comprises:
    transmitting, to the third UE in a first beam direction, the second communication signal.

8. The method of claim 7, further comprising:
    transmitting, to a fourth UE in a second beam direction different than the first beam direction and in the first transmit resource, a third communication signal including the first data block.

9. The method of claim 8, wherein:
    the transmitting the second communication signal to the third UE in the first beam direction is based on a routing configuration including:
        the first hop-destination ID identifying the third UE; and
        the first quasi-co-location (QCL) source associated with the first hop-destination ID and identifying the first beam direction; and
    the transmitting the third communication signal to the fourth UE in the second beam direction is based on the routing configuration further including:
        a second hop-destination ID identifying the fourth UE; and
        a second QCL source associated with the second hop-destination ID and identifying the second beam direction.

10. The method of claim 7, further comprising:
    transmitting, to the third UE in a second beam direction different than the first beam direction and in a second transmit resource different from the first transmit resource, a third communication signal including the first data block.

11. The method of claim 10, wherein:
the transmitting the second communication signal comprises:
  transmitting the first data block based on a first redundancy version; and
the transmitting the third communication signal comprises:
  transmitting the first data block based on the first redundancy version.

12. The method of claim 1, further comprising:
receiving, from a fourth UE within the first receive window, a third communication signal including a second data block for relaying,
wherein the transmitting the second communication signal including the first data block is further based on at least one of a priority of the first data block or a priority of the second data block.

13. The method of claim 1, wherein the CG further indicates a periodicity, and wherein the method further comprises:
  transmitting, to the BS, an indication of a failure to detect a data block for relaying in a second receive window of a second CG occasion, wherein the second CG occasion is based on the periodicity.

14. The method of claim 1, further comprising:
monitoring the first receive window in a plurality of beam directions for a data block for relaying,
wherein the receiving the first communication signal including the first data block is based on the monitoring.

15. A method of wireless communication performed by a base station (BS), the method comprising:
transmitting, to a first user equipment (UE), a first configured grant (CG) indicating a first CG occasion and a routing configuration indicating a quasi-co-location (QCL) source associated with a hop-destination identifier (ID), the first CG occasion including a first transmit resource and a first receive window; and
transmitting, to a second UE, a second CG indicating a second CG occasion, the second CG occasion including a second transmit resource and a second receive window, wherein the first UE and the second UE are associated with a sidelink multi-hop path.

16. The method of claim 15, further comprising:
transmitting, to the first UE, the routing configuration including a hop-destination ID identifying the second UE and one or more QCL sources associated with the hop-destination ID.

17. A first user equipment (UE) comprising:
a memory;
a transceiver; and
at least one processor coupled to the memory and the transceiver, wherein the at least one processor is configured to:
  receive, via the transceiver from a base station (BS), a configured grant (CG) indicating a first CG occasion and a routing configuration indicating a first quasi-co-location (QCL) source associated with a first hop-destination identifier (ID), the first CG occasion including a first transmit resource and a first receive window;
  receive, via the transceiver from a second UE in the first receive window, a first communication signal including a first data block; and
  transmit, via the transceiver to a third UE in the first transmit resource, a second communication signal including the first data block.

18. The first UE of claim 17, wherein the first receive window includes a plurality of receive resources, and wherein the at least one processor configured to receive the first communication signal is configured to:
  receive, in a first receive resource of the plurality of receive resources, the first communication signal.

19. The first UE of claim 17, wherein the first communication signal comprises a hop-destination ID associated with the first data block, and wherein the at least one processor configured to transmit the second communication signal is configured to:
  transmit the second communication signal based on a match between the hop-destination ID and an ID of the first UE.

20. The first UE of claim 17, wherein the first communication signal comprises a destination ID associated with the first data block, and wherein the at least one processor configured to transmit the second communication signal is configured to:
  transmit the second communication signal based on the destination ID being within a set of one or more destination IDs for relaying.

21. The first UE of claim 17, wherein the first communication signal comprises a first destination ID associated with the first data block, and wherein the at least one processor configured to transmit the second communication signal to the third UE is configured to:
  transmit the second communication signal to the third UE based on a routing configuration including:
    a second destination ID corresponding to the first destination ID of the first data block; and
    a hop-destination ID associated with the second destination ID and identifying the third UE.

22. The first UE of claim 17, wherein the at least one processor configured to receive the first communication signal is configured to:
  receive the first communication signal further including a source identifier (ID), a hop-source ID, a hop-destination ID, and a destination ID associated with the first data block.

23. The first UE of claim 17, wherein the at least one processor configured to transmit the second communication signal is configured to:
  transmit, to the third UE in a first beam direction, the second communication signal.

24. The first UE of claim 23, wherein the at least one processor is configured to:
  transmit, via the transceiver to a fourth UE via the transceiver in a second beam direction different than the first beam direction and in the first transmit resource, a third communication signal including the first data block.

25. The first UE of claim 24, wherein:
the at least one processor configured to transmit the second communication signal to the third UE in the first beam direction is configured to:
  transmit the second communication signal to the third UE in the first beam direction based on a routing configuration including:
    the first hop-destination ID identifying the third UE; and
    the first quasi-co-location (QCL) source associated with the first hop-destination ID and identifying the first beam direction; and
the at least one processor configured to transmit the third communication signal to the fourth UE in the second beam direction is configured to:

transmit the third communication signal to the fourth UE in the second beam direction based on the routing configuration further including:
   a second hop-destination ID identifying the fourth UE; and
   a second QCL source associated with the second hop-destination ID and identifying the second beam direction.

26. The first UE of claim 23, wherein the at least one processor is configured to:
   transmit, via the transceiver to the third UE in a second beam direction different than the first beam direction and in a second transmit resource different from the first transmit resource, a third communication signal including the first data block.

27. A base station (BS) comprising:
   a memory;
   a transceiver; and
   at least one processor coupled to the memory and the transceiver, wherein the at least one processor is configured to:
      transmit, via the transceiver to a first user equipment (UE), a first configured grant (CG) indicating a first CG occasion and a routing configuration indicating a quasi-co-location (QCL) source associated with a hop-destination identifier (ID), the first CG occasion including a first transmit resource and a first receive window; and
      transmit, via the transceiver to a second UE, a second CG indicating a second CG occasion, the second CG occasion including a second transmit resource and a second receive window, wherein the first UE and the second UE are associated with a sidelink multi-hop path.

28. The BS of claim 27, wherein the at least one processor is further configured to:
   transmit, via the transceiver to the first UE, the routing configuration including the hop-destination identifier ID identifying the second UE.

* * * * *